US011734918B2

(12) United States Patent
Chiba et al.

(10) Patent No.: US 11,734,918 B2
(45) Date of Patent: Aug. 22, 2023

(54) OBJECT IDENTIFICATION APPARATUS, MOVING BODY SYSTEM, OBJECT IDENTIFICATION METHOD, OBJECT IDENTIFICATION MODEL LEARNING METHOD, AND OBJECT IDENTIFICATION MODEL LEARNING APPARATUS

(71) Applicant: DENSO CORPORATION, Kariya (JP)

(72) Inventors: Kunihiko Chiba, Kariya (JP); Yusuke Sekikawa, Shibuya-ku (JP); Koichiro Suzuki, Shibuya-ku (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 17/105,148

(22) Filed: Nov. 25, 2020

(65) Prior Publication Data

US 2021/0081681 A1   Mar. 18, 2021

Related U.S. Application Data

(63) Continuation of application No. PCT/JP2019/018724, filed on May 10, 2019.

(30) Foreign Application Priority Data

Jun. 1, 2018   (JP) .................................. 2018-106087

(51) Int. Cl.
  *G06V 10/00*   (2022.01)
  *G06V 10/82*   (2022.01)
  *G06V 20/56*   (2022.01)
  *G06V 30/19*   (2022.01)
  *G06V 20/58*   (2022.01)

(52) U.S. Cl.
  CPC ............. *G06V 10/82* (2022.01); *G06V 20/56* (2022.01); *G06V 20/58* (2022.01); *G06V 30/19173* (2022.01)

(58) Field of Classification Search
  CPC .......... G06N 3/04; G06N 3/067; G06V 10/82; G06V 20/56; G06V 20/58; G06V 10/764;
  (Continued)

(56) References Cited

U.S. PATENT DOCUMENTS

2014/0146176 A1\*  5/2014  Hayakawa .............. G06T 7/254
                                              348/148
2017/0083796 A1    3/2017  Kim et al.
(Continued)

FOREIGN PATENT DOCUMENTS

JP      2009087097 A    4/2009
JP      2017059207 A    3/2017

OTHER PUBLICATIONS

Schulter et al, Learning to look around objects for top-view representations of outdoor scenes, arXiv:1803.10870v1 (Year: 2018).*
(Continued)

*Primary Examiner* — Ping Y Hsieh
*Assistant Examiner* — Xiao Liu
(74) *Attorney, Agent, or Firm* — Harness, Dickey & Pierce, P.L.C.

(57) ABSTRACT

An object model learning method includes: in an object identification model forming a convolutional neural network and a warp structure warping a feature map extracted in the convolutional neural network to a different coordinate system, preparing, in the warp structure, a warp parameter for relating a position in the different coordinate system to a position in a coordinate system before warp; and learning the warp parameter to input a capture image in which an object is captured to the object identification model and output a viewpoint conversion map in which the object is identified in the different coordinate system.

17 Claims, 12 Drawing Sheets

(58) Field of Classification Search
CPC .............. G06V 10/454; G06V 20/588; G06V 10/7715; G06V 20/54; G06V 10/753
See application file for complete search history.

(56) References Cited

U.S. PATENT DOCUMENTS

2019/0039614 A1* 2/2019 Nagata .................. B60W 10/18
2019/0325595 A1* 10/2019 Stein ....................... G06V 10/82

OTHER PUBLICATIONS

Jaderberg et al., Spatial Transformer Networks, NIPS (Year: 2015).*
Gupta et al, Cognitive Mapping and Planning for Visual Navigation, CVPR (Year: 2017).*
Dhiman et al, A Continuous Occlusion Model for Road Scene Understanding, CVPR (Year: 2016).*
Jaderberg et al., Spatial Transformer Networks, Google DeepMind, London UK, arXiv:1506.02025v3 [cs.CV] Feb. 4, 2016, pp. 1-15, https://arxiv.org/abs/1506.02025.
Kundu et al., Feature Space Optimization for Semantic Video Segmentation, Computer Vision and Pattern Recognition(CVPR), 2016 (Selected for full oral presentation), http://vladlen.info/publications/feature-space-optimization-for-semantic-video-segmentation/.
D.K., Fully Convolutional Networks for Semantic Segmentation, Apr. 30, 2017, The End of the World, http://dlkento.hatenablog.com/entry/2017/04/30/%E3%83%87%E3%82%A3%E3%83%BC%E3%83%97%E3%83%A9%E3%83%BC%E3%83%8B%E3%83 %B3%E3%82%BO %E3%82%BB%E3%82%B0%E3%83%A1%E3%83%B3%E3%83%86%E3%83%BC%E3%82%B7%E3%83%A7%E3%83%B3%E6%89 %8B%E6%B3%95%E3%81%AE%E3%81%BE (with English Abstract).

* cited by examiner

US 11,734,918 B2

OBJECT IDENTIFICATION APPARATUS, MOVING BODY SYSTEM, OBJECT IDENTIFICATION METHOD, OBJECT IDENTIFICATION MODEL LEARNING METHOD, AND OBJECT IDENTIFICATION MODEL LEARNING APPARATUS

CROSS REFERENCE TO RELATED APPLICATIONS

The present application is a continuation application of International Patent Application No. PCT/JP2019/018724 filed on May 10, 2019, which designated the U.S. and claims the benefit of priority from Japanese Patent Application No. 2018-106087 filed on Jun. 1, 2018. The entire disclosures of all of the above applications are incorporated herein by reference.

TECHNICAL FIELD

The present disclosure relates to an object identification apparatus, a moving body system, an object identification method, an object identification model learning method, and an object identification model learning apparatus.

BACKGROUND

A comparative example shows, as an image recognition method for an advanced driving support system, a method of inputting an input image captured by a capture portion to a convolutional neural network, estimating a center area of an object (recognition target) in the input image, and outputting a value indicating the center area.

SUMMARY

An object model learning method includes: in an object identification model forming a convolutional neural network and a warp structure warping a feature map extracted in the convolutional neural network to a different coordinate system, preparing, in the warp structure, a warp parameter for relating a position in the different coordinate system to a position in a coordinate system before warp; and learning the warp parameter to input a capture image in which an object is captured to the object identification model and output a viewpoint conversion map in which the object is identified in the different coordinate system.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

Figure 1:
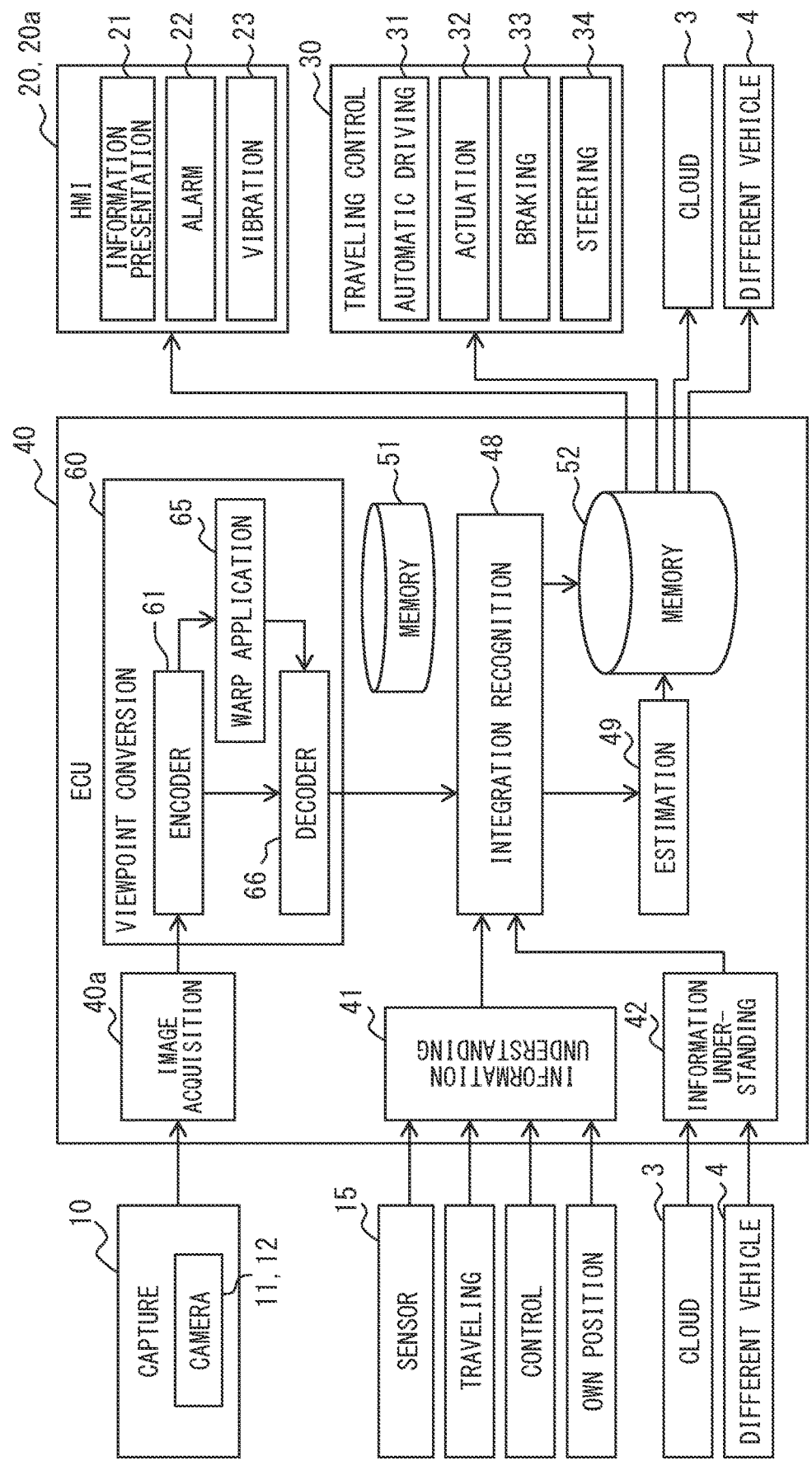
FIG. 1 is a block diagram showing a system configuration of a vehicle system according to a first embodiment.

In the comparative example, each of multiple objects that partially overlap each other on an image can be correctly identified. However, in the comparative example, the object in a capture coordinate system is recognized from a capture viewpoint of a capture portion. It is difficult to grasp a position such as depth (or positional relationship between multiple objects) of the object recognized by such a method.

The present inventors have found that it is required to ease the grasp of the position of the identified object.

One example of the present disclosure provides an object identification apparatus, a moving body system, an object identification method, an object identification model learning method, and an object identification model learning apparatus that are capable of more appropriately grasping an object.

According to one example embodiment, an object identification apparatus is communicatively connected to a moving body and identifies an object in an outside of the moving body. The object identification apparatus includes an image acquisition portion that acquires an image of the outside captured by the capture portion from a predetermined capture viewpoint and a viewpoint conversion map generation portion that forms a convolutional neural network and outputs a viewpoint conversion map obtained by converting the image to a different viewpoint from the capture viewpoint via the convolutional neural network to which data of the image acquired by the image acquisition portion is input. The viewpoint conversion map generation portion includes a feature extraction process portion that applies convolution calculation by the convolutional neural network to the data of the image and extracts a feature map of the object in a first coordinate system based on the capture viewpoint and an output process portion that applies a warp function to the feature map extracted by the feature extraction process portion. The warp function relates a position in a second coordinate system based on the different viewpoint to a position in the first coordinate system and output the viewpoint conversion map in which the object in an area of the second coordinate system is identified.

According to another example embodiment, a moving body system for a moving body is mounted on the moving body, and includes a capture portion that captures an outside of the moving body from a predetermined capture viewpoint and generates an image and an object identification apparatus that identifies the object in the outside of the moving body. The object identification apparatus includes a viewpoint conversion map generation portion that forms a convolutional neural network that receives data of the image and outputs a viewpoint conversion map obtained by converting the image into a viewpoint different from the capture viewpoint. The viewpoint conversion map generation portion includes a feature extraction process portion that applies convolution calculation by the convolutional neural network to the data of the image and extracts a feature map of the object in a first coordinate system based on the capture viewpoint and an output process portion that applies a warp function to the feature map extracted by the feature extraction process portion. The warp function relates a position in a second coordinate system based on the different viewpoint to a position in the first coordinate system and output the viewpoint conversion map in which the object in an area of the second coordinate system is identified.

According to these example embodiments, the image captured by the capture portion passes through the convolutional neural network, and is output as the viewpoint conversion map based on the viewpoint different from the capture viewpoint. Since the object can be identified regardless of the capture viewpoint of the capture portion mounted on the moving body by referring to the viewpoint conversion map, it may be possible to easily grasp the position of the identified object.

In the generation of such a viewpoint conversion map, the warp function is applied to the feature map of the first coordinate system based on the capture viewpoint obtained by applying the convolution calculation to the image data. The warp function relates the position of the second coordinate system based on the different viewpoint to the position of the first coordinate system. By applying the warp function, the object can be identified in the area of the second coordinate system so that the convolution calculation for calculating the local relationship in the first coordinate system is complemented. Therefore, it may be possible to improve the generalization performance of the object identification while suppressing the neural network structure from becoming too deep. As described above, it may be possible to provide the object identification apparatus or the moving body system capable of more appropriately grasping the object outside the moving body.

Further, according to another example embodiment, an object identification method includes inputting data of a capture image of an object captured from a capture viewpoint to a convolutional neural network, applying the data of the capture image to convolution calculation, extracting a feature map in a first coordinate system based on the capture viewpoint, applying a warp function to the feature map, the warp function relating a position in a second coordinate system based on a different viewpoint from the capture viewpoint to a position in the first coordinate system, and obtaining a viewpoint conversion map in which the data of the capture image is converted from the capture viewpoint to the different viewpoint based on the feature map to which the warp function is applied and the object is identified.

According to such an example embodiment, the warp function is applied to the feature map of the first coordinate system based on the capture viewpoint obtained by applying the convolution calculation to the image data. The warp function relates the position of the second coordinate system based on the different viewpoint to the position of the first coordinate system. By applying the warp function, the object can be identified in the area of the second coordinate system so that the convolution calculation for calculating the local relationship in the first coordinate system is complemented. Therefore, it may be possible to improve the generalization performance of the object identification while suppressing the neural network structure from becoming too deep. The viewpoint conversion map is a map obtained based on the feature map to which the warp function is applied. In the viewpoint conversion map, the object is identified from the viewpoint different from the capture viewpoint. Hence, the viewpoint conversion map MB has higher reliability.

Furthermore, according to another example embodiment, in an object identification model forming a convolutional neural network and a warp structure warping a feature map extracted in the convolutional neural network to a different coordinate system, an object identification model learning method includes preparing, in the warp structure, a warp parameter for relating a position in the different coordinate system to a position in a coordinate system before warp, and learning the warp parameter to input a capture image in which an object is captured to the object identification model and output a viewpoint conversion map in which the object is identified in the different coordinate system.

According to such an example embodiment, the warp parameter relating the position of the different coordinate system to the position of the coordinate system before the warp is learned. Therefore, the map output in the object identification model can be smoothly converted from the coordinate system before the warp into the different coordinate system. By referring to the viewpoint conversion map, the object can be identified regardless of the capture viewpoint of the capture image. Accordingly, it may be possible to implement the object identification model capable of appropriately grasping the object.

Furthermore, according to another example embodiment, an object identification model learning apparatus is a learning apparatus that learns an object identification model. The object identification model learning apparatus includes a calculation circuit that executes a calculation process of the object identification model that forms a convolutional neural network and a warp structure that warps a feature map extracted in the convolutional neural network to a different coordinate system, a teacher data setting portion that sets data of a capture image of an object captured from a capture viewpoint and an output map, as correct answer data, in which the object is identified in a coordinate system based on a different viewpoint from the capture viewpoint, and a learning portion that learns a kernel parameter for a kernel of the convolutional neural network and a warp parameter for the warp structure to output data closer to the correct data when the capture image is input to the object identification model, and a memory device that stores the kernel parameter and the warp parameter that are learned by the learning portion.

According to such an example embodiment, the calculation circuit is provided for learning the object identification model. The calculation circuit can execute the calculation process of the object identification model forming the convolutional neural network and the warp structure that warps the feature map extracted by the convolutional neural network to the different coordinate system. This calculation circuit is used. Here, the kernel parameter and the warp parameter are learned so that the data closer to the correct answer data is output when the capture image is input to the object identification model. After learning, the memory device can store the kernel parameter and the warp parameter. Accordingly, since the learning of the object identification model including the warp structure can be smoothly performed, the object identification model can be configured as the learning model having the higher generalization performance. As described above, it may be possible to easily implement the object identification model capable of more appropriately grasping the object.

Furthermore, according to another example embodiment, an object identification apparatus is communicatively connected to a camera mounted on a moving body and identifies an object in an outside of the moving body. The object identification apparatus includes a calculation device that reads a kernel parameter from the learning value memory, forms a convolutional neural network including an encoder that includes multiple feature amount extraction units and a decoder portion that includes multiple identification units, causes the encoder portion to extract a feature map of a feature amount of the object from data of the image acquired by the image acquisition portion, reads a warp parameter from the learning value memory, generates multiple warp functions corresponding to the multiple identification units, applies the multiple warp functions to the feature map to cause the multiple identification units to read the multiple warp functions respectively corresponding identification units, and generates a viewpoint conversion map of which viewpoint is converted into a different viewpoint from a viewpoint captured by the camera.

According to such an example embodiment, the kernel parameter is read from the learning value memory storing the learning value. The convolutional neural network is configured by the encoder portion and the decoder portion. The warp parameter is read from the learning value memory. The multiple warp functions corresponding to the multiple identification units of the decoder portion are generated. In applying the multiple warp functions to the feature map, the warp function acts so as to cause the identification units of the decoder portion to consider the local relationship based on the different viewpoint so that the convolutional neural network to which the calculation is applied is complemented in consideration of the local relationship. As the result, it is possible to output the viewpoint conversion map in which the local relationship based on the different viewpoint in the process of the identification by the decoder portion is sufficiently reflected.

Hereinafter, multiple embodiments will be described with reference to the drawings. It is noted that the same reference numerals are attached to the corresponding constituent elements in each embodiment, and redundant explanation may be omitted. In each of the embodiments, when only a part of the configuration is described, the other parts of the configuration may be applied to the other embodiments. Further, not only the combinations of the configurations explicitly shown in the description of the respective embodiments, but also the configurations of the multiple embodiments can be partially combined even when they are not explicitly shown as long as there is no difficulty in the combination in particular.

First Embodiment

A moving body system according to a first embodiment of the present disclosure is, as shown in FIG. 1A, a vehicle system 9 for a vehicle as a moving body, and is mounted on a vehicle 1. Here, the vehicle 1 means the own vehicle in order to distinguish the own vehicle from a different vehicle 4. However, the own vehicle is merely described as a "vehicle" (except some exceptions), and a vehicle other than the own vehicle is described as the "different vehicle". The vehicle system 9 includes a capture portion 10, an autonomous sensor portion 15, a HMI instrument portion 20, a vehicle travel controller 30, and an ECU (electronic control unit) 40 or the like.

The capture portion 10 includes multiple cameras 11. Each of the cameras 11 includes a capture element, a lens, and a circuit unit 12 as a controller. The capture element is an element that converts light into electric signals by photoelectric conversion, and for example, a CCD image sensor or a CMOS image sensor can be employed. The capture element forms a rectangular area in which pixels are arranged two-dimensionally. In order to form an image of a capture target on the capture element, the lens is placed between a capture target and the capture element.

The circuit unit 12 is an electronic circuit including at least one processor, a memory device, and an input output interface. The processor is a calculation circuit that executes the computer program stored in the memory device. The memory device is provided by, for example, a semiconductor memory or the like, and is a non-transitory tangible storage medium for non-temporally storing the computer program and data that are readable by the processor. The circuit unit 12 is electrically connected to the capture element, and thereby controls the capture element. The circuit unit 12 generates an image IM as data including a detection result of each pixel, and outputs the corresponding data as the electric signal to the ECU 40.

In such a manner, each of the cameras 11 of the capture portion 10 sequentially captures the outside of the vehicle 1 from a predetermined capture viewpoint PVP based on the arrangement, and generates the data of the image IM. In the present embodiment, each of the multiple cameras 11 captures the outside of the vehicle 1 in a direction different from each other, from the capture viewpoint PVP different from each other. The multiple cameras 11 include a camera 11 that is arranged at a front portion of the vehicle 1 and captures the front of the outside of the vehicle 1 (see FIG. 5).

The autonomous sensor portion 15 detects, so as to assist the capture portion 10, an object such as the pedestrian in the outside of the vehicle 1, the different vehicle 4, a fallen object on a road, a traffic signal, a guardrail, a curbstone, a road signe, a road marking or a lane marker. The autonomous sensor portion 15 includes at least one autonomous sensor such as, for example, a lidar unit, a millimeter wave radar, or a sonar. Since the autonomous sensor portion 15 can communicate with the ECU 40, the autonomous sensor portion 15 outputs the detection result data of each autonomous sensor portion 15 as the electric signal to the ECU 40.

The HMI instrument portion 20 mainly includes an instrument group for implementing an HMI (human machine interface). Specifically, the HMI instrument portion 20 includes an information presentation portion 21, an alarm portion 22, and a vibration portion 23.

The information presentation portion 21 mainly presents visual information to an occupant of the vehicle 1. The information presentation portion 21 includes, for example, at least one display of a combination meter including a display instrument that displays the image, a head up display that projects the image on a windshield or the like of the vehicle 1 and displays a virtual image, a car navigation display that can display a navigation image, or the like. Since the information presentation portion 21 can communicable with the ECU 40, the information presentation portion 21 provides visual information in accordance with an input of the electric signal from the ECU 40.

The alarm portion 22 performs alarming to the occupant of the vehicle 1. The alarm portion 22 includes, for example, at least one sound oscillation device of a speaker, a buzzer, or the like. Since the alarm portion 22 can communicate with the ECU 40, the alarm portion 22 perform alarming in accordance with input of the electric signal from the ECU 40.

The vibration portion 23 provides the information or the alarm to the occupant of the vehicle 1 by vibration. The vibration portion 23 includes, for example, at least one actuator of an actuator that vibrates a steering wheel of the vehicle 1, an actuator that vibrates a seat on which the occupant seats, or the like. Since the vibration portion 23 can communicate with the ECU 40, the vibration portion 23 executes vibration in accordance with the input of the electric signal from the ECU 40.

In the HMI instrument portion 20 described above, a circuit unit 20a can be placed as the controller that controls the information presentation portion 21, the alarm portion 22, and the vibration portion 23. The circuit unit 20a is an electronic circuit including at least one processor, a memory device, an input output interface. The processor is a calculation circuit that executes the computer program stored in the memory device. The memory device is provided by, for example, a semiconductor memory or the like, and is a non-transitory tangible storage medium for non-temporally storing the computer program and data that are readable by the processor. The circuit unit 20a can convert the electric signal from the ECU 40 into the signal in accordance with the information presentation portion 21, the alarm portion 22, and the vibration portion 23, and can share a part of the information presentation process and the alarm process.

The vehicle travel controller 30 includes an electronic circuit that includes at least one processor, the memory device, or the input output interface. The processor is a calculation circuit that executes the computer program stored in the memory device. The memory device is provided by, for example, a semiconductor memory or the like, and is a non-temporally tangible storage medium for non-temporally storing the computer program and data that are readable by the processor. Since the vehicle travel controller 30 can communicate with the ECU 40, a drive device of the vehicle 1, a braking device, and the steering device, the vehicle travel controller 30 receives the electric signal from the ECU 40, and outputs the electric signal to the drive device of the vehicle 1, the braking device, and the steering device.

The vehicle travel controller 30 includes an automatic driving controller 31, a drive controller 32, a braking controller 33, and a steering controller 34 as a function block achieved by execution of the computer program.

The automatic driving controller 31 has an automatic driving function that can executes, at least, a part of the driving operation of the vehicle 1 in place of the driver as the occupant. While the automatic driving function operates, the automatic driving controller 31 acquires information useful for automatic driving from an integration memory 52 of the ECU 40, uses the corresponding information, and executes the automatic driving control of the vehicle 1. Specifically, the automatic driving controller 31 controls the drive device of the vehicle 1 via the drive controller 32, controls the braking device of the vehicle 1 via the braking controller 33, and controls a steering device of the vehicle 1 via the steering controller 34. The automatic driving controller 31 controls the traveling of the vehicle 1 by coordinating the drive device, the braking device, and the steering device with each other, and avoids a risk that may be encountered by the corresponding vehicle 1 depending on a situation of the outside of the vehicle 1.

Figure 2:
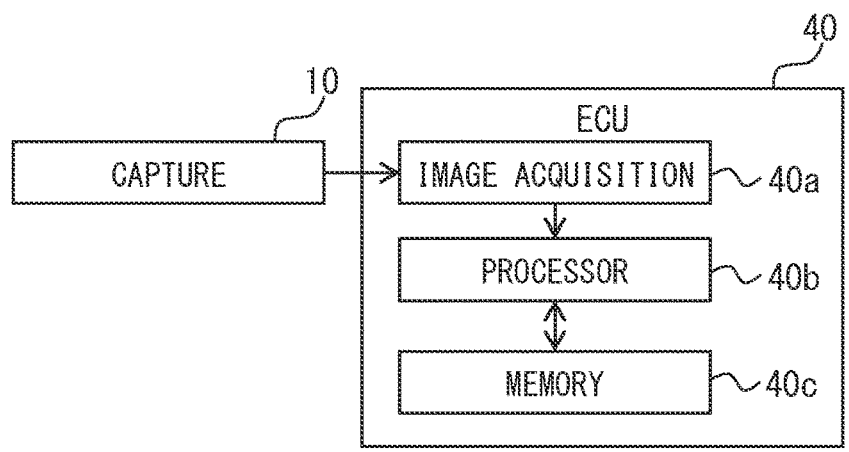
FIG. 2 is a block diagram schematically showing a circuit configuration of an ECU of FIG. 1.

The ECU 40 is a so-called computer and functions as an object identification apparatus that identifies the object outside the vehicle 1. As shown in FIG. 2, the ECU 40 mainly includes an electronic circuit that includes at least one processor 40b, a memory device 40c, and the input output interface (for example, an image acquisition portion 40a). The processor 40b is a calculation circuit that executes the computer program stored in the memory device 40c. The memory device 40c is provided by, for example, a semiconductor memory or the like, and is a non-transitory tangible storage medium for non-temporally storing the computer program that is readable by the processor 40b and the data. At least one part of the computer program can be replaced with an artificial intelligence algorithm using a neural network. In the present embodiment, a part of the functions is implemented by the neural network.

As shown in FIG. 1, the ECU 40 is communicatively connected to the capture portion 10, the autonomous sensor portion 15, the HMI instrument portion 20, and the vehicle travel controller 30, as described above. In addition, the ECU 40 can acquire the travel information of the vehicle 1, the control information of the vehicle 1, own position information of the vehicle 1, information from a cloud 3, and information from the different vehicle 4 based on the input of the electric signal via the communication. Furthermore, the ECU 40 can provide information to the cloud 3 and the different vehicle 4. Here, the cloud 3 means a network implemented by cloud computing or a computer connected to the network, or means both of the network and the computer. The cloud 3 can share the data, and provide various services for the vehicle 1.

In the present embodiment, the communication between the ECU 40 and each element is provided by a vehicle interior network such as, for example, CAN (registered trademark), or a public communication network such as, for example, a mobile phone network or an internet. However, various suitable communication methods may be employed in regardless of a wire communication or wireless communication.

In FIG. 1, the cloud 3 is shown in two places for convenience. However, these may be the same clouds or different clouds. This similar applies to the different vehicle 4. In the present embodiment, it is assumed that these are same, and the description will be continued with the same reference numerals. A different reference numeral or no reference numeral is applied to another vehicle different from the different vehicle 4 that communicates with the vehicle 1.

The ECU 40 includes an own vehicle information understanding portion 41, a different vehicle information understanding portion 42, a viewpoint conversion map generation portion 60, an integration recognition portion 48, and a future information estimation portion 49, as the function blocks. The ECU 40 includes a learning value memory 51 defined by a memory area that occupies a part of the memory device 40c. The ECU 40 includes the integration memory 52 defined by a memory area that occupies a part of the memory device 40c.

The own vehicle information understanding portion 41 sequentially acquires the information from the autonomous sensor portion 15, the travel information of the vehicle 1, the control information and the own position information, that is, information regarding the own vehicle via the input output interface, organizes these information, and understands the information.

The different vehicle information understanding portion 42 sequentially acquires the information from the cloud 3 and the information from the different vehicle 4, that is, information regarding the different vehicle 4 via an input output interface, organizes these information, and understands the information.

Figure 3:
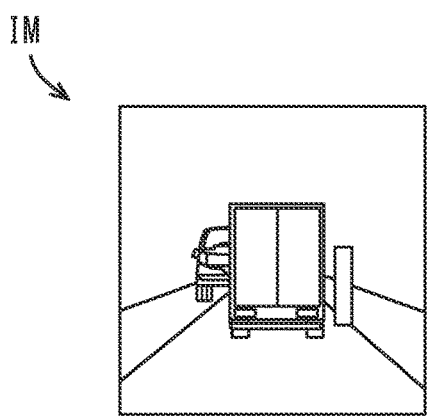
FIG. 3 is one example of an image captured by a capture portion according to the first embodiment.
Figure 4:
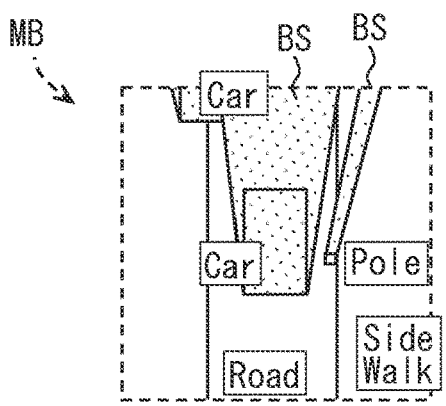
FIG. 4 is one example of a viewpoint conversion map generated by inputting the image of FIG. 3 to a viewpoint conversion map generation portion.

The viewpoint conversion map generation portion 60 functions as a calculation device using a computer, receives the image IM of the outside that is shown in FIG. 3 and captured by the capture portion 10 from the predetermined capture viewpoint PVP, and outputs a viewpoint conversion map MB as shown in FIG. 4. The viewpoint conversion map MB is obtained by converting the image IM into a different viewpoint from the capture viewpoint PVP. The image IM is input via the image acquisition portion 40a that is the input output interface acquiring the image data from the capture portion 10 and is the signal conversion circuit.

Figure 5:
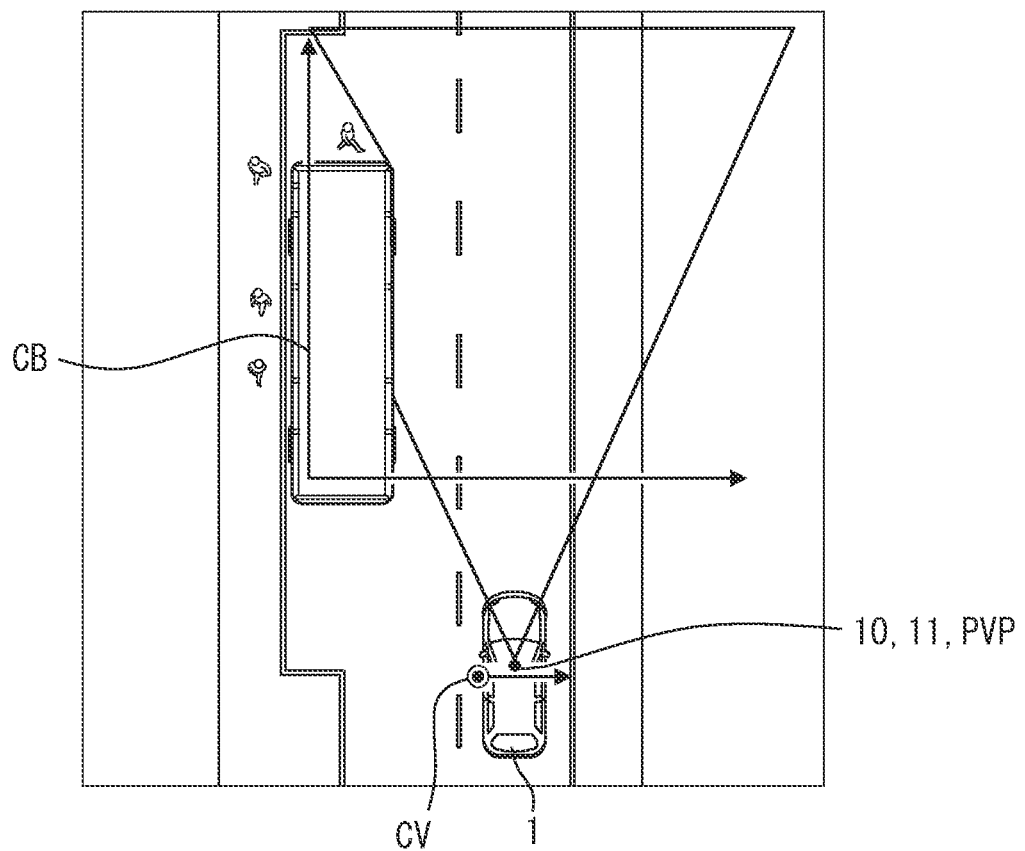
FIG. 5 is a view for describing a capture coordinate system and a bird's eye view coordinate system according to the first embodiment.

Specifically, the predetermined capture viewpoint PVP is a viewpoint from the vehicle 1 to the outside of the vehicle 1 since each of the cameras 11 of the capture portion 10 is mounted on the vehicle 1, as shown in FIG. 5. On the other hand, the different viewpoint after the conversion is a viewpoint different from the viewpoint from the vehicle 1 to the outside of the vehicle 1. For example, a bird's eye viewpoint of the outside of the vehicle 1 viewed from the sky may be employed.

That is, the image data of a first coordinate system (hereinafter, referred to as a capture coordinate system CV) based on the capture viewpoint PVP is converted into the viewpoint conversion map MB of a second coordinate system (hereinafter, a bird's eye view coordinate system CB) based on the different viewpoint, and is output. The bird's eye view coordinate system CB is a coordinate system of a two dimensional space having a movable direction of the vehicle 1, and particularly, in the first embodiment, defined as a coordinate system of a two dimensional space along a virtual plane perpendicular to a vertical center plane of the vehicle 1.

The viewpoint conversion map generation portion 60 divides an area of the viewpoint conversion map MB based on the property, and adds a label corresponding to the property to the divided area. Here, the property may mean an existence possibility of the object, and further a type of the object when the existence possibility of the object is high. The label is a symbol according to the type of the object, for example, such as a pedestrian, a different vehicle (for example, car), a road, a sidewalk, or a pole. Such an area division method is referred to as Semantic Segmentation. The object is identified by this division.

As shown in FIG. 1, the integration recognition portion 48 improves an identification accuracy of the area and the object by integrating and recognizing, in addition to the viewpoint conversion map MB generated by the viewpoint conversion map generation portion 60, the information understood by the own vehicle information understanding portion 41, the information understood by the different vehicle information understanding portion 42, and furthermore the viewpoint conversion map MB obtained from the image IM captured by the capture portion 10 in the past.

Specifically, the integration recognition portion 48 adds the information understood by the own vehicle information understanding portion 41 to the result. For example, when the autonomous sensor portion 15 detects a part of the inside of the blind angle area BS that is a blind angle of the object from the capture viewpoint PVP, it may be possible to improve the identification accuracy of the object in the detected area. The integration recognition portion 48 can reflect the information such as this detection result on the viewpoint conversion map MB.

The integration recognition portion 48 adds the information understood by the different vehicle information understanding portion 42 to the result. For example, when the capture portion 10 mounted on the different vehicle 4 recognizes a part of the inside of the blind angle area BS in accordance with the capture portion 10 of the vehicle 1, it may be possible to improve the identification accuracy of the area and the object. The integration recognition portion 48 can reflect the information from this different vehicle 4 on the viewpoint conversion map MB.

Figure 6:
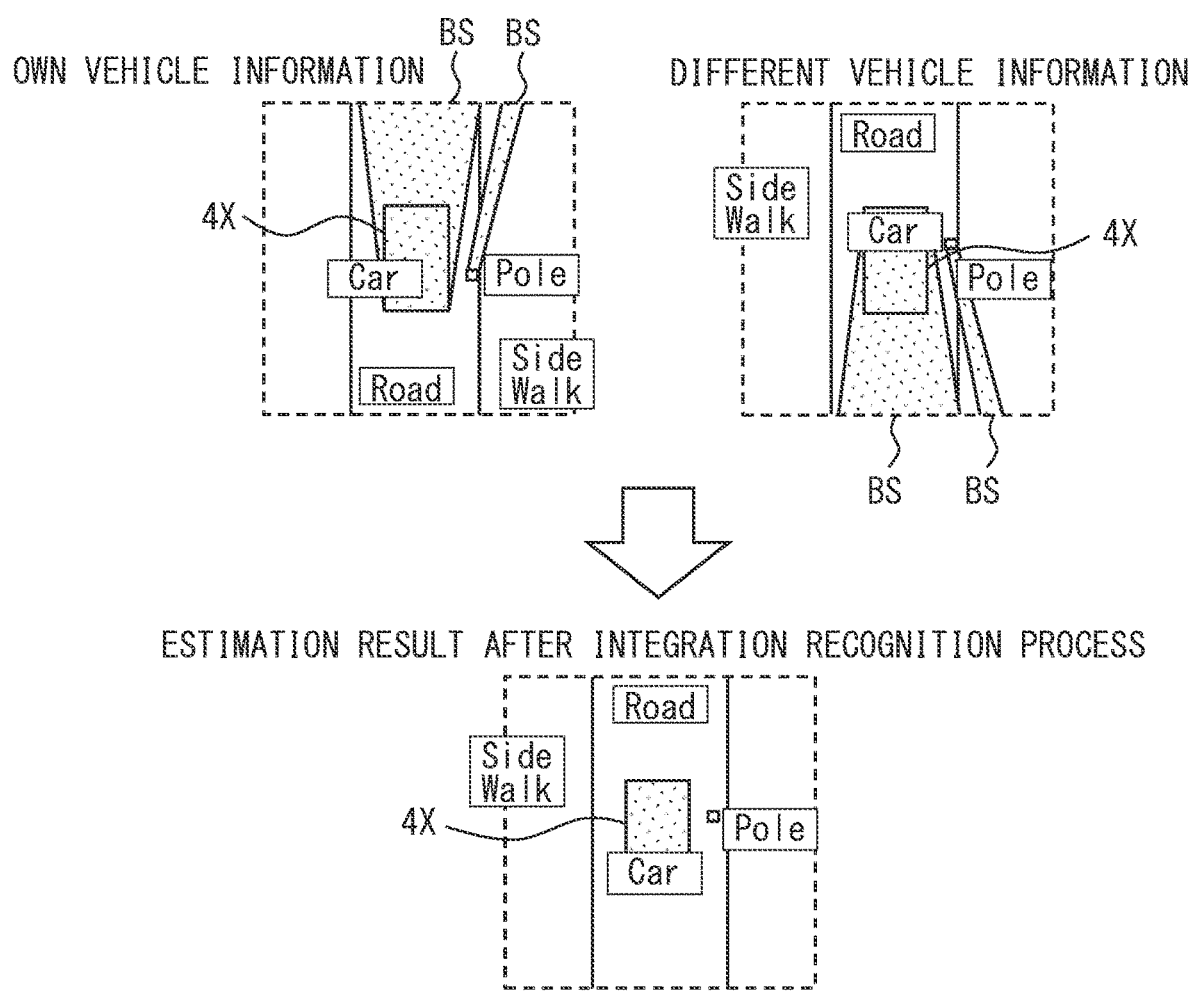
FIG. 6 is a view for describing one example of integration recognition according to the first embodiment.

For example, as shown in FIG. 6, the viewpoint conversion map MB obtained from the image IM of the front of the vehicle 1 captured by the capture portion 10 of the vehicle 1 and the viewpoint conversion map MB obtained from the image of the rear of the different vehicle 4 captured by the capture portion 10 of the different vehicle 4 located in front of the corresponding vehicle 1 are integrated. Thereby, even when the different vehicle 4X and the object such as a utility pole exist between the vehicle 1 and the different vehicle 4, the blind angle area BS is narrowed. It may be possible to obtain the highly accurate identification result.

The future information estimation portion 49 predicts the feature in cooperation with the integration recognition portion 48. For example, the future information estimation portion 49 can estimate a time point when the pedestrian appears from the inside of the blind angle area BS to the outside of the blind angle area BS, based on the position PP where the existence possibility of the pedestrian is high inside the blind angle area BS in the current viewpoint conversion map MB, the past movement speed of the above pedestrian, and the past movement direction of the pedestrian.

Figure 7:
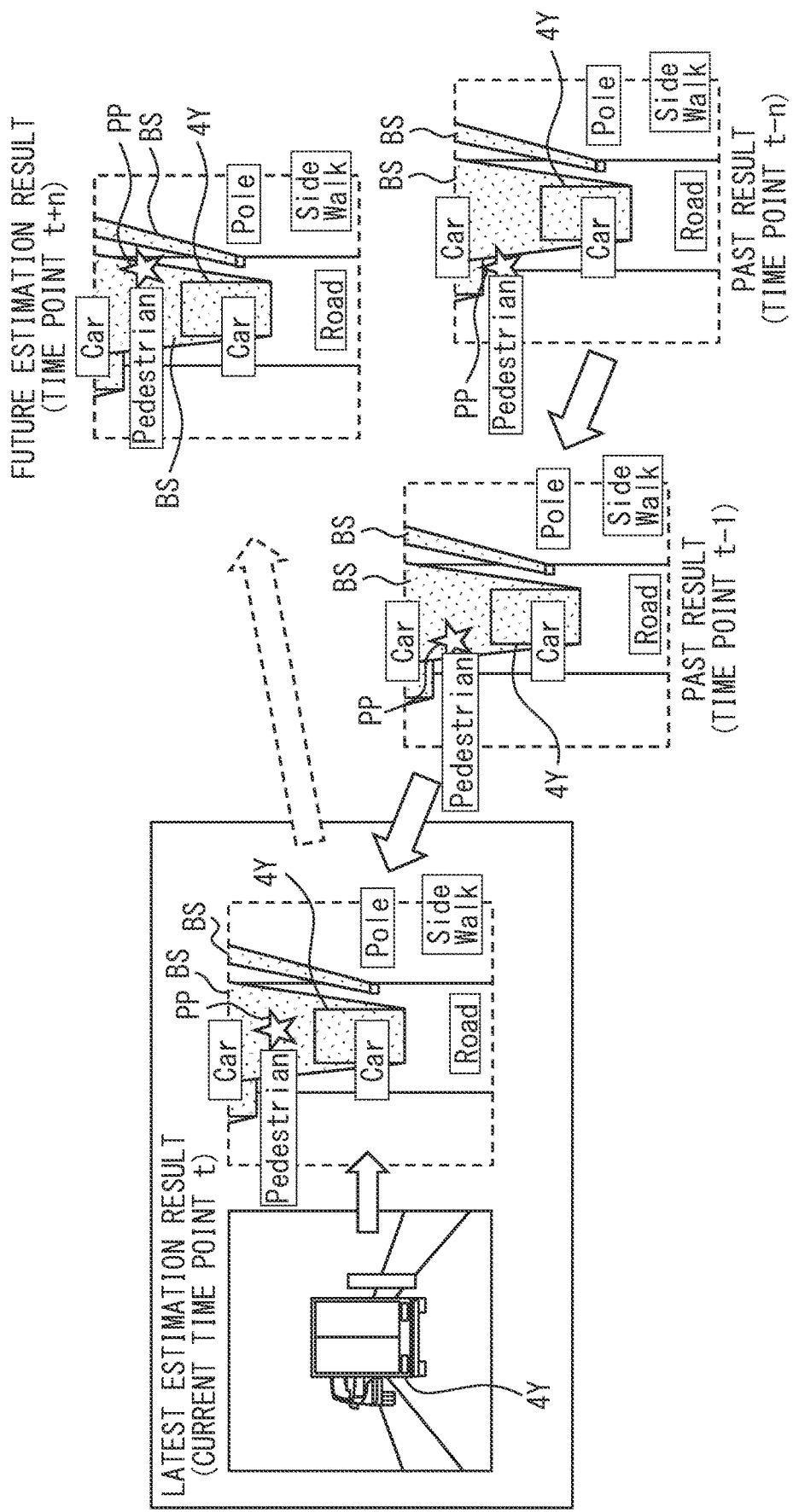
FIG. 7 is a view for describing estimation of a position of a pedestrian according to the first embodiment.

Specifically, as shown in FIG. 7, a case where the different vehicle 4Y in front of the vehicle 1 stops due to, for example, a red traffic signal or the like and the corresponding different vehicle 4Y forms the blind angle area BS is assumed. The movement speed and the movement direction of the pedestrian are calculated based on the positions PP of the pedestrian identified in the outside of the blind angle area BS in area data at a past time point t−n (where the n is an arbitrary number larger than 1) and area data at a past time point t−1. Even when the pedestrian is not recognized in the image IM at a current time point t, the position where the existence possibility of the pedestrian is high inside the blind angle area BS is estimated based on the calculated movement speed and the movement direction. Further, the pedestrian appears again outside the blind angle area BS at a time point t+n in the feature.

The viewpoint conversion map MB to which the estimation result is added in such a manner is stored in the integration memory 52 and accumulated, as shown in FIG. 1.

The integration recognition portion 48 determines whether the alarm by the alarm portion 22 of the HMI instrument portion 20 and the vibration by the vibration portion 23 are necessary based on the existence possibility of the pedestrian or the like.

The viewpoint conversion map MB stored in the integration memory 52 can be output to the HMI instrument portion 20, the vehicle travel controller 30, the cloud 3, and the different vehicle 4 as the electric signal using the communication.

Figure 8:
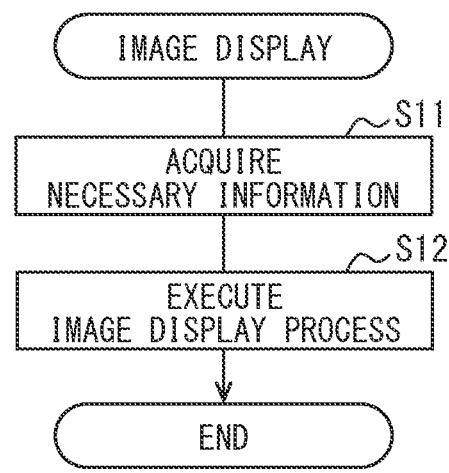
FIG. 8 is a flowchart showing an image display process by the vehicle system according to the first embodiment.

The information presentation portion 21 of the HMI instrument portion 20 that is the output destination of the viewpoint conversion map MB acquires data necessary for presentation of the information, for example, the latest viewpoint conversion map MB or the like from the integration memory 52 of the ECU 40 (see S11 of FIG. 8). The information presentation portion 21 presents the acquired viewpoint conversion map MB as visual information obtained by visualizing the acquired viewpoint conversion map MB to the occupant of the vehicle 1. Specifically, as the visual information, the viewpoint conversion map MB as shown in FIG. 4 is displayed as the image by, for example, one of a display instrument of a combination meter, a head up display, and a car navigation display (see S12 of FIG. 8).

When the alarm is determined to be necessary, the alarm portion 22 of the HMI instrument portion 20 acquires the content of the alarm via the integration memory 52 of the ECU 40. The alarm portion 22 issues the alarm to the occupant of the vehicle 1. Specifically, the alarm provided by the voice emitted from the speaker or the alarm provided by the alarm sound emitted from the buzzer is executed.

When the vibration is determined to be necessary, the vibration portion 23 of the HMI instrument portion 20 acquires the content of the vibration via the integration memory 52 of the ECU 40. The vibration portion 23 generates the vibration in a mode in which the occupant of the vehicle 1 can sense the vibration. The vibration portion 23 is preferably linked to the alarm by the alarm portion 22.

Figure 9:
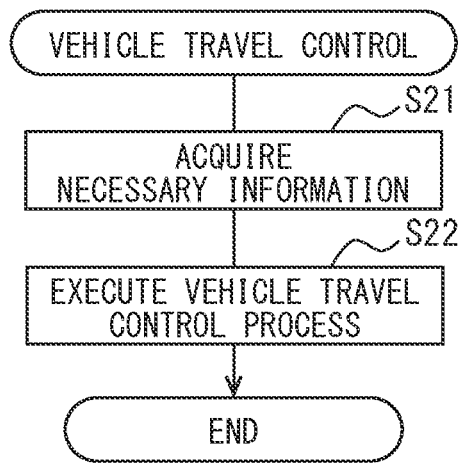
FIG. 9 is a flowchart showing a vehicle travel control process by the vehicle system according to the first embodiment.

The automatic driving controller 31 of the vehicle travel controller 30 is the output destination of the viewpoint conversion map MB, and acquires the data necessary for the automatic driving, for example, the latest viewpoint conversion map MB or the like from the integration memory 52 of the ECU 40 (see S21 of FIG. 9). The automatic driving controller 31 controls traveling of the vehicle 1 by using the acquired data.

Here, in the viewpoint conversion map MB, the coordinate system of the two dimensional space having the movable direction of the vehicle 1 based on the bird's eye viewpoint of the outside of the vehicle 1 is employed. Therefore, information of a vertical direction in which the vehicle 1 cannot move is excluded. Thereby, the increase in the amount of data of the viewpoint conversion map MB is suppressed in accordance with excluded information. Therefore, since it may be possible to provide the information of the two dimensional space suitable for controlling the traveling of the vehicle 1 to the automatic driving controller 31 with less delay and reduce the information processing time of the automatic driving controller 31, it may be possible to implement the advance automatic driving function.

When the estimation result of the future information estimation portion 49 is also taken into consideration in the automatic driving controller 31, it may be possible to further improve the validity of automatic driving function.

A process by the viewpoint conversion map generation portion 60 in the vehicle system 9 described above will be detail in more detail below.

Figure 10:
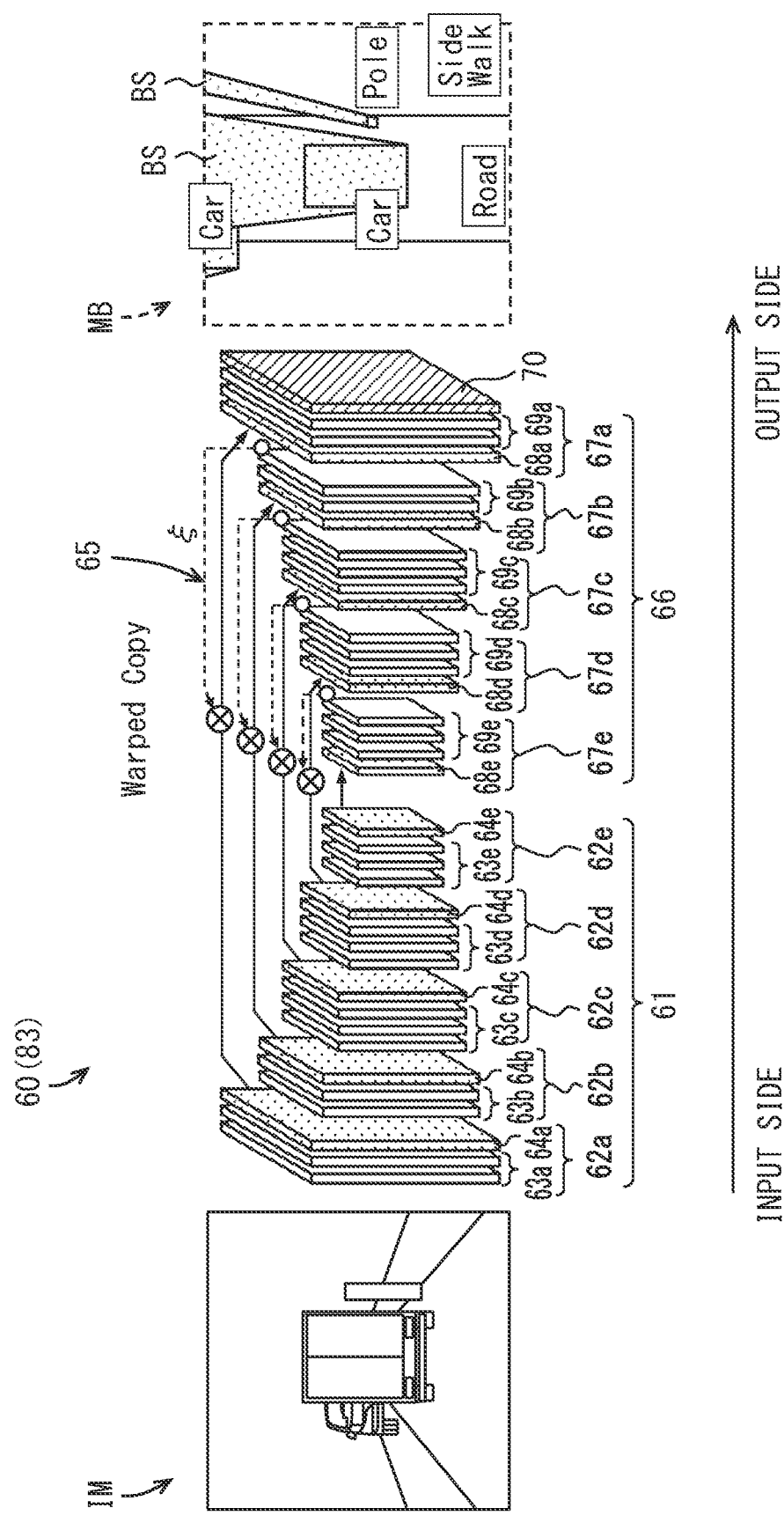
FIG. 10 is a view for describing the viewpoint conversion map generation portion and the object identification model according to the first embodiment.

The viewpoint conversion map generation portion 60 includes an encoder portion 61, a warp application portion 65, and a decoder portion 66 as sub functional blocks whose functions are subdivided. As shown in FIG. 10, in the first embodiment, the encoder portion 61 and the decoder portion 66 configure the neural network (in more detail, the convolutional neural network) that can be regarded as a lump. As the entire of the viewpoint conversion map generation portion 60 including a warp structure by the warp application portion 65, the object identification model by an artificial intelligence algorithm mainly including the neural network is formed. The object identification model causes the computer to function so that the encoder portion 61, the warp application portion 65, and the decoder portion 66 perform the functions described below.

The encoder portion 61 has multiple (for example, five) feature extraction units 62a, 62b, 62c, 62d, and 62e so that the multiple extraction units are connected in series from the input side to the output side. The feature extraction units 62a to 62e respectively have convolution layers 63a, 63b, 63c, 63d, and 63e, and pooling layers 64a, 64b, 64c, 64d, and 64e arranged on the output side of the convolution layers 63a to 63e so that the convolution layer and the pooling layer are connected in series with each other. In FIG. 10, in order to distinguish the pooling layers 64a to 64e from the convolution layers 63a to 63e, dots are hatched to the pooling layers 64a to 64e.

A width and a height (that is, the size of the matrix of the map) of each of the layers 63a to 63e and 64a to 64e belonging to the same feature extraction units 62a to 62e are substantially same. On the other, as the position of each of the feature extraction units 62a to 62e is closer to the output side, the size is smaller.

The size of each of the layers 63a to 63e and 64a to 64e belonging to the feature extraction unit 62a positioned closest to the input side corresponds to the number of image arrays of the camera 11 of the capture portion 10, and is set so that, for example, data including a detection result (for example, a pixel value) in each pixel of the image IM acquired by the image acquisition portion 40a can be input in a matrix shape in which the pixel array is relatively maintained. Of course, when the resolution of the image IM is reduced by the image acquisition portion 40a or the like, the size can be reduced accordingly. In such a manner, the image data acquired by the image acquisition portion 40a is input to the convolution layers 63a to 63e in the feature extraction unit 62a positioned closest to the input side.

Each of the convolution layers 63a to 63e performs calculation for convoluting the input data with use of a local filter (referred to as a kernel or a feature extractor) having a predetermined size (for example, 3×3, 5×5) defined for each of the convolution layers 63a to 63e. For example, an input value input to a position corresponding to each element of the kernel is multiplied by a weighting coefficient preset in the kernel for each element. The linear sum of the multiplication values for each element is calculated. A bias preset in the kernel is added to this linear sum, and thereby the convolution calculation is performed. In the present embodiment, the weighting coefficient and the bias are collectively referred to as a kernel parameter in order to distinguish them from the warp parameter ξ.

The result of such convolutional calculation is converted by the activation function. As the activation function, for example, ReLU (Rectified Linear Unit) can be employed.

The convolution layers 63a to 63e perform the convolution calculation described above and the conversion using the activation function multiple times, and thereby can form multi layers as shown in FIG. 10. For example, in the present embodiment, the convolution layers 63a to 63e are multi-layered into two to three layers. In such a manner, a feature map is obtained from the image IM input to the encoder portion 61.

Each of the pooling layers 64a to 64e calculates a local statistic of the feature map output from the corresponding convolution layers 63a to 63e that are connected to the input side and are the upper layers. Specifically, a window having a predetermined size (for example, 2×2, 3×3) corresponding to a position of the upper layer is set, and the local statistic is calculated from the input value in the window. As the local statistic, for example, a maximum value can be employed. That is, the input value in the window can be integrated by employing the maximum value of the input value in the window as the pooling result.

Unlike the kernel set in the convolution calculation, positions of the windows set in the pooling calculation often do not overlap with each other (however, may partially overlap with each other). As a result, the size of the feature map output from the pooling layers 64a to 64d is reduced in accordance with the size of the window. This is called down sampling.

When the pooling layer is not the pooling layer 64e belonging to the feature extraction unit 62e closest to the output side, the feature maps output from the pooling layers 64a to 64d are input to the convolution layers 63b to 63e of the next feature extraction units 62b to 62e. Since the feature maps are downsampled in the pooling layers 64a to 64d, the size of each of the next feature extraction units 62b to 62e should be smaller than a size of the input side so that the downsampled feature map can be input in a matrix.

When the pooling layer is the pooling layer 64e belonging to the feature extraction unit 62e closest to the output side, the feature map output from the pooling layer 64e is, for example, output from the encoder portion 61, and input to the decoder portion 66.

In such a manner, the encoder portion 61 outputs the downsampled feature map. By this downsampling, the encoder portion 61 is regarded to compress (encode) the feature map. Here, each of the layers 63a to 63e and 64a to 64e of the encoder portion 61 processes the image data input in the matrix shape in which the pixel arrangement is relatively maintained, without breaking the relative position of the two dimensional space. Therefore, the encoder portion 61 is regarded to extract, in the form of the feature map, the feature of the object in the outside area in the capture coordinate system CV.

When the pooling layer is not the pooling layer 64e belonging to the feature extraction unit 62e closest to the output side, the feature maps output from the pooling layers 64a to 64d are output from the encoder portion 61, and input to the warp application portion 65. That is, the feature map of an intermediate layer of the encoder portion 61 is output to the warp application portion 65. In the present embodiment, the pooling layers 64a to 64d of four feature extraction units 62a to 62d excluding the pooling layer 64e closest to the output side output four feature maps to the warp application portion 65.

The warp application portion 65 applies a warp function to the input feature map, and generates a warped copy. The warp function relates the position of the bird's eye view coordinate system CB to the position of the capture coordinate system CV. Specifically, the warp application portion 65 generates the warped copy based on the warp function expressed by the following mathematic expression 1.

$$F_b(i, j, k) = \sum_{i,j} w_{i,j} F_v(\xi_v(\hat{i}, \hat{j}), \xi_v(\hat{i}, \hat{j}), k)$$ [Mathematic expression 1]

In the mathematic expression 1, the i and the j represent the i-th row and the j-th column of the matrix in the feature map after the conversion, and indicate the position in the bird's eye view coordinate system CB. The i with the caret symbol and the j with the caret symbol represent the i-th row and the j-th column of the matrix in the feature map before the conversion, and indicate the position in the capture coordinate system CV. The k corresponds to a component of the feature map corresponding to the position (i, j) or the position (i with the caret symbol, j with the caret symbol).

The $F_b$ (i, j, k) is the warped copy, that is, the feature map after the conversion. The w is a parameter that represents a preset weight corresponding to the position of the feature map before the conversion (the subscript of the mathematic expression 1 is omitted). The $\xi_v$ and $\xi_u$ (hereinafter, two are collectively referred to as $\xi$) are variables (hereinafter, warping parameters) for performing warping from the position (i with the caret symbol, j with the caret symbol) of the capture coordinate system CV to the position (i, j) of the bird's eye view coordinate system CB.

That is, the warped copy is generated by correcting, by the parameter w, the feature map $F_v$ warped by the warp parameter $\xi$. That is, the position (i, j) is naturally a discrete value (integer). Therefore, unless the value returned by the warp parameter $\xi$ is the integer, a correspondence between the position of the matrix before the conversion and the position of the matrix after the conversion becomes unclear. In order to clarify this correspondence, the parameter w functions as a coefficient for correcting the value returned by the warp parameter $\xi$ to the integer.

Such a warped copy is generated for each of the pooling layers 64a to 64d of the feature extraction units 62a to 62d excluding the feature extraction unit 62e closest to the output side, is output from the warp application portion 65, and input to the decoder portion 66.

The sizes of the feature maps output from the feature extraction units 62a to 62d are different from each other. Therefore, as the warp parameter $\xi$ of the warp function, parameters different from each other are correspondingly prepared for each of the feature extraction units 62a to 62d. However, the difference in the warp parameter $\xi$ is caused from the resolution due to the size of the feature map to be applied. The warp functions exhibit the similar functions to each other.

The warp in the present embodiment may mean that, by using the variable that is called the warp parameter $\xi$ and corresponds to the depth, the extracted feature is converted from the capture coordinate system CV to the bird's eye view coordinate system CB. In other words, the warp function indicates from which pixel value of the capture coordinate system CV the pixel value at each position of the bird's eye view coordinate system CB should be obtained.

It should be noted here that, in the warping, the pixel values at all positions of the capture coordinate system CV are not copied to the decoder portion 66 via the warped copy. For example, when a pixel with the captured sky exists in the image IM input to the encoder portion 61, the pixel is unnecessary information for the viewpoint conversion map MB of the bird's eye view coordinate system CB, and therefore is not copied. On the contrary, when the depth of the viewpoint conversion map MB of the bird's eye view coordinate system CB is expressed, the same pixels (positions of the capture coordinate system CV) with the captured object at multiple positions of the bird's eye view coordinate system CB may be overlappingly selected. That is, it may be copied from one position on the image IM where the object is captured to multiple positions of the bird's eye view coordinate system CB.

This warp parameter ξ is a function of the position of the capture coordinate system CV as shown in the mathematic expression 1, and, however, a function of the input image IM input to the encoder portion 61. When the detection value of the autonomous sensor of the autonomous sensor portion 15 or a value obtained by correcting this detection value is referred, in addition, the warp parameter ξ becomes a function of the detection value (depth value of the detected object) of the autonomous sensor portion 15.

The decoder portion 66 includes multiple (for example, five, which is the same number as the feature extraction units 62a to 62e) identification units 67e, 67d, 67c, 67b, 67a so that the identification units are connected in series from the input side to the output side, and includes a softmax layer 70 on a side closest to the output. The identification units 67e to 67a respectively include unpooling layers 68e, 68d, 68c, 68b, and 68a and deconvolution layers 69e, 69d, 69c, 69b, and 69a arranged on the output side of the unpooling layers 68e to 68a so that unpooling layers and the deconvolution layers are connected in series with each other.

Each of the identification units 67a to 67e is pair with each of the feature extraction units 62a to 62e. The n-th feature extraction unit 62b to 62e (where the n is a natural number) from the feature extraction unit 62a closest to the input is pair with the n-th identification unit 67d to 67a from the identification unit 67e closest to the output. The feature extraction units and the identification units are individually associated with each other.

In such a manner, each of the unpooling layers 68a to 68e is individually associated with each of the pooling layers 64a to 64e of the feature extraction units 62a to 62e in one-on-one relation. The associated pair has the substantially same size. The unpooling layers 68e to 68a enlarge the size of the feature map downsampled by the encoder portion 61 again. This is referred to as upsampling, and the unpooling layers 68e to 68a are also referred to as upsampling layers.

The feature map from the feature extraction unit 62e is input to the unpooling layer 68e belonging to the identification unit 67e closest to the input without being warped. Then, the input value from the pooling layer 64e positioned in this upper layer is input each of multiple positions configuring an adjacent range (for example, a range of 2×2 when the size is quadrupled) in the unpooling layer 68 in accordance with the expansion of the size. Accordingly, the unpooling layer 68 of the present embodiment forms a dense map (a map having few elements with a value of 0).

For concatenating the input value from each of the deconvolution layers 69d to 69b connected to the input side with the warped copy, multiple (for example, two) channels are set in the unpooling layers 68d to 68a excluding the unpooling layer belonging to the identification unit 67e closest to the input. That is, the input value from the upper layer is stored in one channel of the unpooling layers 68d to 68a. The warped copy obtained by warping the feature map output from the individually corresponding pooling layers 64d to 64a is stored in the other channel of the unpooling layers 68d to 64a.

The deconvolution layers 69e to 69a perform deconvolution (referred to as transposed convolution) calculation on the input feature map. The deconvolution calculation is calculation that restores the feature map before the convolution calculation under the assumption that the input feature map is a result of the convolution calculation using the specific kernel. In this calculation, for example, the feature map for the output can be generated by calculating the product of a transposed matrix of a matrix generated from the specific kernel and the input feature map.

Similarly to the convolution layers 63a to 63e, the deconvolution layers 69e to 69a can be multi-layered. For example, in the present embodiment, the deconvolution layers 69e to 69a are multi-layered in two or three layers.

In the encoder portion 61, the convolution calculation by the convolution layers 63a to 63e is the main calculation. Thereby, a calculation target is a relationship of pixels that are close to each other in the image IM captured by the capture portion 10. A relationship between pixels that are separated from each other is not sufficiently taken into consideration. That is, the positions adjacent to each other in the bird's eye view coordinate system CB should originally have a strong relationship. However, this is not taken into consideration. On the other hand, in the deconvolution layers 69e to 69a, the deconvolution calculation using, as the input values, the unpooling layers 68e to 68a in which the warped copy is copied and concatenated is performed. Thereby, a relationship to be considered in the bird's eye view coordinate system CB can be reflected in the result.

The softmax layer 70 is provided in the last layer closest to the output in the decoder portion 66. The softmax layer 70 applies the softmax function to the input value from the deconvolution layer 69a connected to the input side, and thereby outputs the probability of the label for identifying the object at each position (pixel). That is, in the object identification in the present embodiment, the label of the object may not be uniquely determined, and only the probability of the label may be determined.

In the process of the upsampling in the decoder portion 66, the warped copy obtained by warping the feature map of the capture coordinate system CV to the bird's eye view coordinate system CB acts on the deconvolution layers 69d to 69a via the unpooling layers 68d to 68a. Therefore, the feature map finally output from the softmax layer 70 of the decoder portion 66 is the viewpoint conversion map MB in which the object in the area of the bird's eye view coordinate system CB is identified. In the present embodiment, the viewpoint conversion map MB output via the convolutional neural network is a planar map in accordance with a bird's viewpoint that is a viewpoint when the outside of the vehicle 1 is viewed from the sky. By the upsampling, the decoder portion 66 is regarded to decode the feature map.

The multiple warped copies having different sizes act on each of the individually corresponding unpooling layers 68d to 68a, and thereby both of low frequency information and high frequency information are reflected in the finally output viewpoint conversion map MB.

Here, in order to output the identification result in the viewpoint conversion map MB, it is preferable that the viewpoint conversion map generation portion 60 has been learned as the object identification model. In the convolutional neural network by the viewpoint conversion map generation portion 60, the parameter of the kernel is set by machine learning in advance, and non-temporarily stored in the learning value memory 51. Along with this, the warp parameter ξ is set by the machine learning in advance, and non-temporarily stored in the learning value memory 51.

In the machine learning in the object identification model including the warp structure of the present embodiment, the object identification model is a non-convex function. Therefore, even when a teacher is given to the input image IM and the output viewpoint conversion map MB, it is difficult to simultaneously learn all the kernel parameter and the warp parameter ξ.

Figure 11:
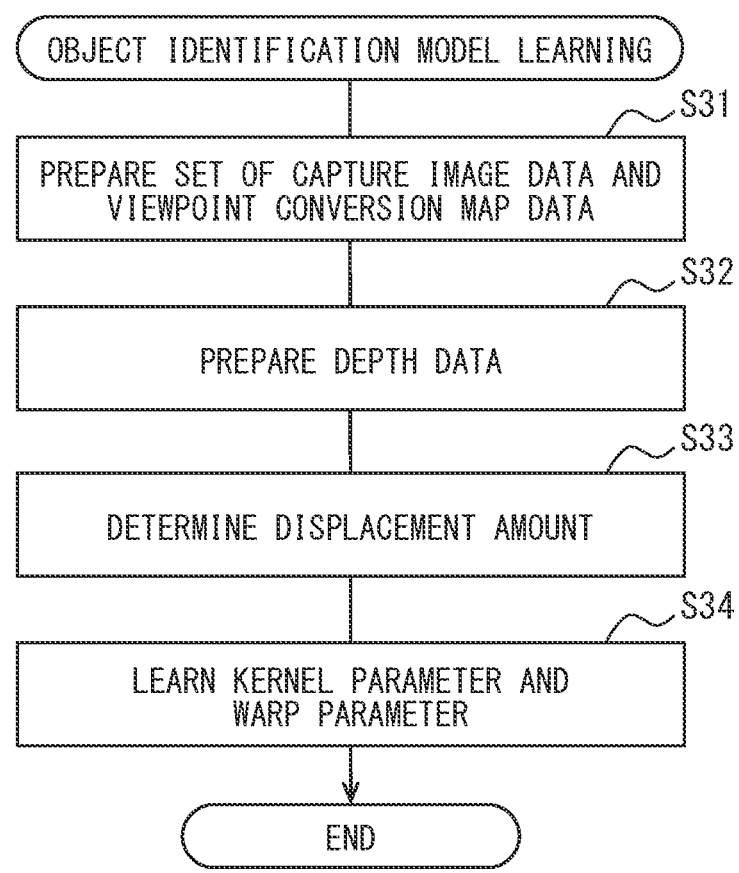
FIG. 11 is a flowchart showing an object identification model learning method according to the first embodiment.

Therefore, in the present embodiment, a learning method shown in a flowchart of FIG. 11 is employed. The learning method will be described below.

In this method, first, multiple sets of the data of the input image IM input by the encoder portion 61 and data of the viewpoint conversion map MB that is correct answer data in accordance with the data of the input image IM are prepared (see S31 of FIG. 11). The set of data is the teacher.

Next, depth data indicating a depth (distance from the capture portion 10 to the object) of the object reflected in the input image IM is prepared for each prepared set (see S32 of FIG. 11). This depth data is also substantially used as the teacher. The order of S31 and S32 may be interchanged.

This depth data is referred, and the displacement amount of a part of the warp parameter $\xi$ is determined (see S33 of FIG. 11). That is, based on the depth data, it can be determined that the position of the pixel in which the object is shown in the input image IM corresponds to a position of a surface layer portion of the object in the viewpoint conversion map MB, the surface layer portion facing the vehicle 1. In other words, the displacement amount of the warp parameter $\xi$ corresponding to the outside position of the blind angle area BS of the viewpoint conversion map MB can be determined.

Here, determining the displacement amount means changing the warp parameter $\xi$ (i withe caret symbol, j with the caret symbol) from a variable to a constant (in other words, fixing the warp parameter $\xi$ to the constant). However, when the warp parameter $\xi$ is the function of the detection value of the autonomous sensor, determining the displacement amount may mean changing the detection value from the variable to the constant (in other words, fixing the detection value to the constant).

When the input image IM is input to the object identification mode in a state where the displacement amount of a part of the warp parameter $\xi$ is determined, the kernel parameter and the other part in the non-determined state in the warp parameter $\xi$ are simultaneously learned (see S34 in FIG. 11) so that data closer to data that is pair with the input image IM, the data of the viewpoint conversion map MB, and exists as the correct answer data is output from the object identification model.

Specifically, the input image IM is input to this object identification model, and a difference between the data output from the object identification model and the correct answer data is calculated. As this difference, for example, a KL divergence can be used. The KL divergence is a measure for example measuring a difference between probability distributions. The sum of the KL divergence calculated for each set is used as a cost (objective function). For example, by using a method of the gradient descent or the like, the kernel parameter minimizing this cost and the other part in the non-determined state in the warp parameter $\xi$ are searched and calculated.

In this cost calculation, the displacement amount of a part corresponding to the outside position of the blind angle area BS in the warp parameter $\xi$ is determined. Therefore, in the cost that is the function of the kernel parameter and the warp parameter $\xi$, the number of local minimum solutions can be reduced. As the result, it can be converged to the optimal value based on the kernel parameter and the warp parameter $\xi$. Therefore, it may be possible to improve generalization performance of the object identification model.

The machine learning of this warp parameter $\xi$ is performed for solving a problem that which pixel of the input image IM of the capture coordinate system CV corresponds to which label of each position of the blind angle area BS in the viewpoint conversion map MB of the bird's eye view coordinate system CB. By learning this problem, this object identification model can estimate the blind angle area BS in accordance with the blind angle of the object on the image captured by the capture portion 10. In detail, by estimating the depth and the shape of the back side of the object, the object identification model can distinguish between, in the blind angle area BS of the viewpoint conversion map MB of the bird's eye view coordinate system CB, an area (that is, area corresponding to the depth of the object) where the existence possibility of the object is high and an area where the existence possibility of the object is low (that is, a space on the back side of the object).

In more detail, in the search described above, the correspondence between a position on the viewpoint conversion map MB corresponding to the blind angle area BS and a position on the input image IM is searched. Specifically, with respect to the position (i, j) on the viewpoint conversion map MB corresponding to the blind angle area BS, the position (i with the caret symbol, j with the caret symbol) is designated based on a random initial value. The cost is calculated when the warp parameter $\xi$ warps the position (i with the caret symbol, j with the caret symbol) to the position (i, j). The warp parameter $\xi$ minimizing the cost is searched by gradually changing the position (i with the caret symbol, j with the caret symbol) where the cost becomes smaller.

Figure 12:
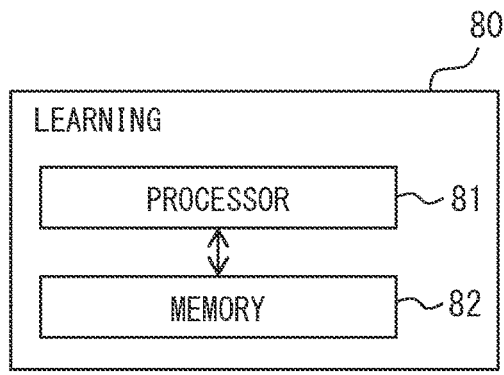
FIG. 12 is a block diagram schematically showing a circuit configuration of a learning apparatus according to the first embodiment.
Figure 13:
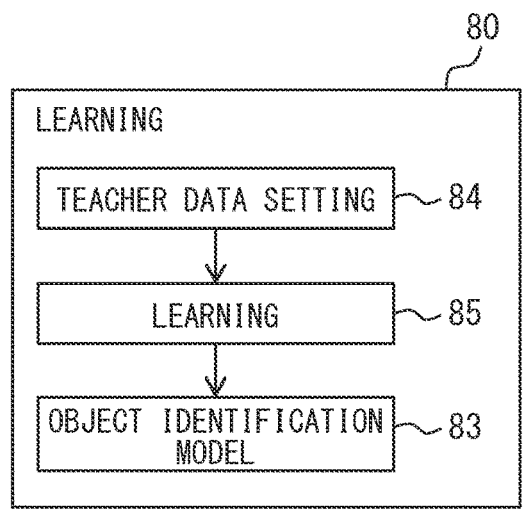
FIG. 13 is a block diagram showing a system configuration of the learning apparatus of FIG. 12.
Figure 14:
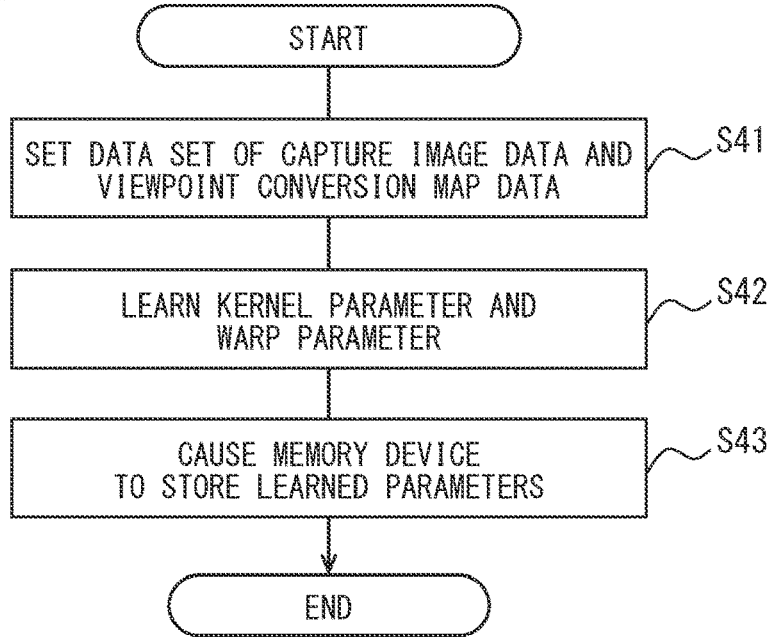
FIG. 14 is a flowchart by the learning apparatus of FIG. 13.

The machine learning can be implemented by, for example, a learning apparatus 80 shown in FIG. 12 and FIG. 13. FIG. 14 shows a flowchart performed by the learning apparatus 80.

As shown in FIG. 12, the learning apparatus 80 is so-called computer, and mainly includes an electronic circuit that includes at least one processor 81, a memory device 82, and an input output interface. The processor 81 is a calculation circuit that executes the computer program stored in the memory device 82. The memory device 82 is provided by, for example, a semiconductor memory, and is a non-transitory tangible storage medium for non-temporally storing the computer program and data that are readable by the processor 81. The processor 81 can execute the calculation process of an object identification model 83 described above.

As shown in FIG. 13, the learning apparatus 80 includes, as functional blocks configured by using the processor 81 that executes the calculation process of the object identification model 83 or another additional processor, a teacher data setting portion 84 and a learning portion 85.

The teacher data setting portion 84 sets a set of the above described data to be the teacher (see S41 of FIG. 14). This setting may be, for example, converting a data set input by the operator operating the learning apparatus 80 into a form that the learning portion 85 can use for learning. In addition, this setting may mean correcting, by the teacher data setting portion 84, the data set from the cloud 3 and converting the data set into the form that the learning portion 85 can use for the learning, when the learning apparatus 80 is communicatively connected to the external device such as the vehicle 1, the cloud 3, or the like.

This learning portion 85 learns the kernel parameter and the warp parameter $\xi$ so that, when the input image IM is input to this object identification model 83, the data closer to the data that is pair with the input image IM, that exists as the correct data, and that is the data of the viewpoint conversion map MB, is output from the object identification model 83 (see S42 of FIG. 14). The details of the learning procedure correspond to the above described details of the learning method.

The learned kernel parameter and the learned warp parameter ξ are stored in the memory device 82 (see S43 of FIG. 14). The kernel parameter and the warp parameter ξ that are stored in this memory device 82 can be taken out of the learning apparatus 80 via the input output interface or the like.

The operation and effect of the first embodiment described above will be described below.

According to the ECU 40 or the vehicle system 9 of the first embodiment, the image IM captured by the capture portion 10 passes through the convolutional neural network, and is output as the viewpoint conversion map MB based on the viewpoint different from the capture viewpoint PVP. Since the object can be identified regardless of the capture viewpoint PVP of the capture portion 10 mounted on the vehicle 1 by referring to the viewpoint conversion map MB, it may be possible to easily grasp the position of the identified object.

In the generation of such a viewpoint conversion map MB, the warp function is applied to the feature map of the capture coordinate system CV based on the capture viewpoint PVP obtained by applying the convolution calculation to the image data. The warp function relates to the position of the bird's eye view coordinate system CB based on the different viewpoint to the position of the capture coordinate system CV. By applying the warp function, the object can be identified in the area of the bird's eye view coordinate system CB so that the convolution calculation for calculating the local relationship in the capture coordinate system CV is complemented. Therefore, it may be possible to improve the generalization performance of the object identification while suppressing the neural network structure from becoming too deep. As described above, it may be possible to more appropriately grasp the object in the outside of the vehicle 1.

According to the first embodiment, the bird's eye view coordinate system CB based on the different viewpoint is a coordinate system of the two dimensional space having the movable direction of the vehicle 1. In such a manner, the viewpoint conversion map MB of the bird's eye view coordinate system CB of the two dimensional space having the movable direction of the vehicle 1 is output. Thereby, it may be possible to appropriately grasp the object to be an obstacle in movement (travel) of the vehicle 1 while it may be possible to reduce the information amount as compared with the three dimensional space and quickly identify the object. Therefore, it may be possible to support the smooth movement of the vehicle 1.

According to the first embodiment, the memory device 40c stores the kernel parameter that memory device 40c uses for the kernel of the convolutional neural network and the warp parameter ξ. The processor 40b processes the convolution calculation using the kernel parameter and the application calculation of the warp function using the warp parameter. Accordingly, the kernel parameter and the warp parameter ξ can be appropriately and quickly utilized for the convolution calculation and the application calculation of the warp function. Therefore, it may be possible to easily implement the ECU 40 that identifies the object outside the vehicle 1.

According to the first embodiment, the viewpoint conversion map generation portion 60 includes the warp application portion 65 that applies the warp function to the feature map extracted by the encoder portion 61, and the decoder portion 66 that concatenates the warped copy to which the warp function is applied and the convolutional neural network and outputs the viewpoint conversion map MB in which the object in the area of the bird's eye view coordinate system CB is identified. The warped copy is concatenated with the convolutional neural network and further calculated. Thereby, it becomes possible to generate the viewpoint conversion map MB in sufficient consideration of the relationship between the positions adjacent to each other in the bird's eye view coordinate system CB. Accordingly, it may be possible to improve the identification result output by the viewpoint conversion map MB.

According to the first embodiment, in the process of upsampling by the unpooling layers 68a to 68e, the output results from the deconvolution layers 69a to 69e connected to the input side are concatenated with the warped copy. Since the deconvolution calculation is sequentially applied based on such concatenated data, it becomes possible to output the viewpoint conversion map MB in sufficient consideration of the relationship between the positions adjacent to each other in the bird's eye view coordinate system CB while the decoder portion 66 gradually increases the resolution. Accordingly, it may be possible to improve the identification result output by the viewpoint conversion map MB.

According to the first embodiment, the kernel parameter is read from the learning value memory 51 storing the learning value. The convolutional neural network is configured by the encoder portion 61 and the decoder portion 66. The warp parameter ξ is read from the learning value memory 51. The multiple warp functions corresponding to the multiple identification units 67a to 67e of the decoder portion 66 are generated. In applying the multiple warp functions to the feature map, the warp function acks so as to cause the identification units 67a to 67e of the decoder portion 66 to consider the local relationship based on the different viewpoint so that the convolutional neural network to which the calculation is applied is complemented in consideration of the local relationship. As the result, it is possible to output the viewpoint conversion map MB in which the local relationship based on the different viewpoint in the process of the identification by the decoder portion 66 is sufficiently reflected.

According to the first embodiment, the information presentation portion 21 as the image display portion displays the image obtained by visualizing the viewpoint conversion map MB. Since such a viewpoint conversion map MB makes it easy to understand a distance relationship of the objects as the two dimensional information, a viewer of the visualized image can more appropriately grasp the object outside the vehicle 1.

According to the first embodiment, the vehicle travel controller 30 as the movement controller controls the travel of the vehicle 1 by using the viewpoint conversion map MB. In this aspect, since the vehicle travel controller 30 can quickly understand and process the distance relationship of the object as the two dimensional information, it may be possible to implement the advanced traveling control of the vehicle 1 in real time.

According to the object identification method of the first embodiment, the warp function is applied to the feature map of the capture coordinate system CV based on the capture viewpoint PVP obtained by applying the convolution calculation to the image data. The warp function relates the position of the bird's eye view coordinate system CB based on the different viewpoint to the position of the capture coordinate system CV. By applying the warp function, the object can be identified in the area of the bird's eye view coordinate system CB so that the convolution calculation for calculating the local relationship in the capture coordinate system CV is complemented. Therefore, it may be possible to improve the generalization performance of the object identification while suppressing the neural network structure from becoming too deep. The viewpoint conversion map MB is a map obtained based on the feature map to which the warp function is applied. In the viewpoint conversion map MB, the object is identified from the viewpoint different from the capture viewpoint PVP. Hence, the viewpoint conversion map MB has higher reliability.

According to the learning method of the object identification model 83 of the first embodiment, the warp parameter ξ relating the position of the coordinate system CB after the warp to the position of the coordinate system CV before the warp is learned. Therefore, the map MB output in the object identification model can be smoothly converted from the coordinate system CV before the warp into the different coordinate system CB. By referring to the viewpoint conversion map MB, the object can be identified regardless of the capture viewpoint PVP of the capture image IM. Accordingly, it may be possible to implement the object identification model capable of appropriately grasping the object.

According to the learning method of the first embodiment, since the kernel parameter and the warp parameter ξ are learned by using the common data set, it may be possible to the number of processes for learning. In the viewpoint conversion model, the convolutional neural network and the warp structure more integrally function, and the object identification model as the learning model having the high generalization performance can be configured. Accordingly, it may be possible to implement the object identification model capable of appropriately grasping the object.

According to the learning method of the first embodiment, the kernel parameter and the other part in the non-determined state in the warp parameter ξ are simultaneously learned in a state where the displacement amount is the displacement of a part of the warp parameter ξ, corresponds to the position outside the blind angle area BS that is the blind angle of the object on the input image IM, and is determined at the learning. When the displacement amount of a part of the warp parameter ξ is determined in such a manner, it may be possible to reduce the number of local minimum solutions in the cost for learning. Therefore, it may be possible to improve the generalization performance of the object identification model by converging the kernel parameter and the warp parameter ξ to the more optimized values.

According to the learning method of the first embodiment, at the learning, the correspondence between the position corresponding to the blind angle area BS on the output map and the position on the input image IM is searched. By such a such, both positions are more appropriately related in the warp function. Therefore, it may be possible to improve the generalization performance of the object identification model.

The learning apparatus 80 of the object identification model 83 of the first embodiment includes the processor 81 for learning the object identification model 83. The processor 81 is the calculation circuit capable of executing the calculation process of the object identification model 83 forming the convolutional neural network and the warp structure that warps the feature map extracted by the convolutional neural network to the different coordinate system. This processor 81 is used. Here, the kernel parameter and the warp parameter are learned so that the data closer to the correct answer data is output when the capture image IM is input to the object identification model 83. After learning, the memory device 82 can store the kernel parameter and the warp parameter. Accordingly, since the learning of the object identification model 83 including the warp structure can be smoothly performed, the object identification model 83 can be configured as the learning model having the higher generalization performance. As described above, it may be possible to easily implement the object identification model 83 capable of more appropriately grasping the object.

In the first embodiment, the encoder portion 61 corresponds to a "feature extraction process portion", and the warp application portion 65 and the decoder portion 66 corresponds to an "output process portion". The decoder portion 66 corresponds to an "identification process portion".

Second Embodiment

Figure 15:
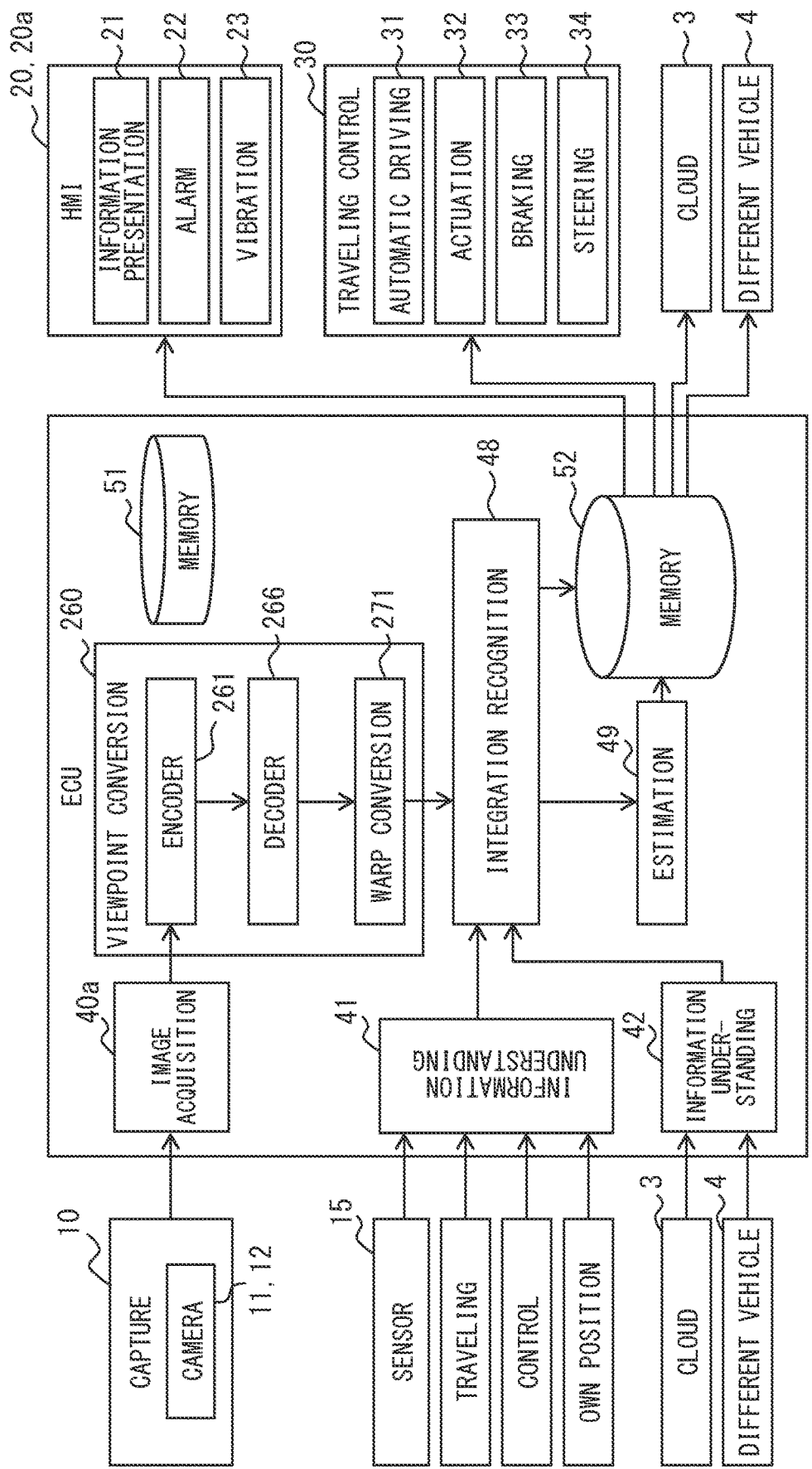
FIG. 15 is a block diagram showing a system configuration of a vehicle system according to a second embodiment.
Figure 16:
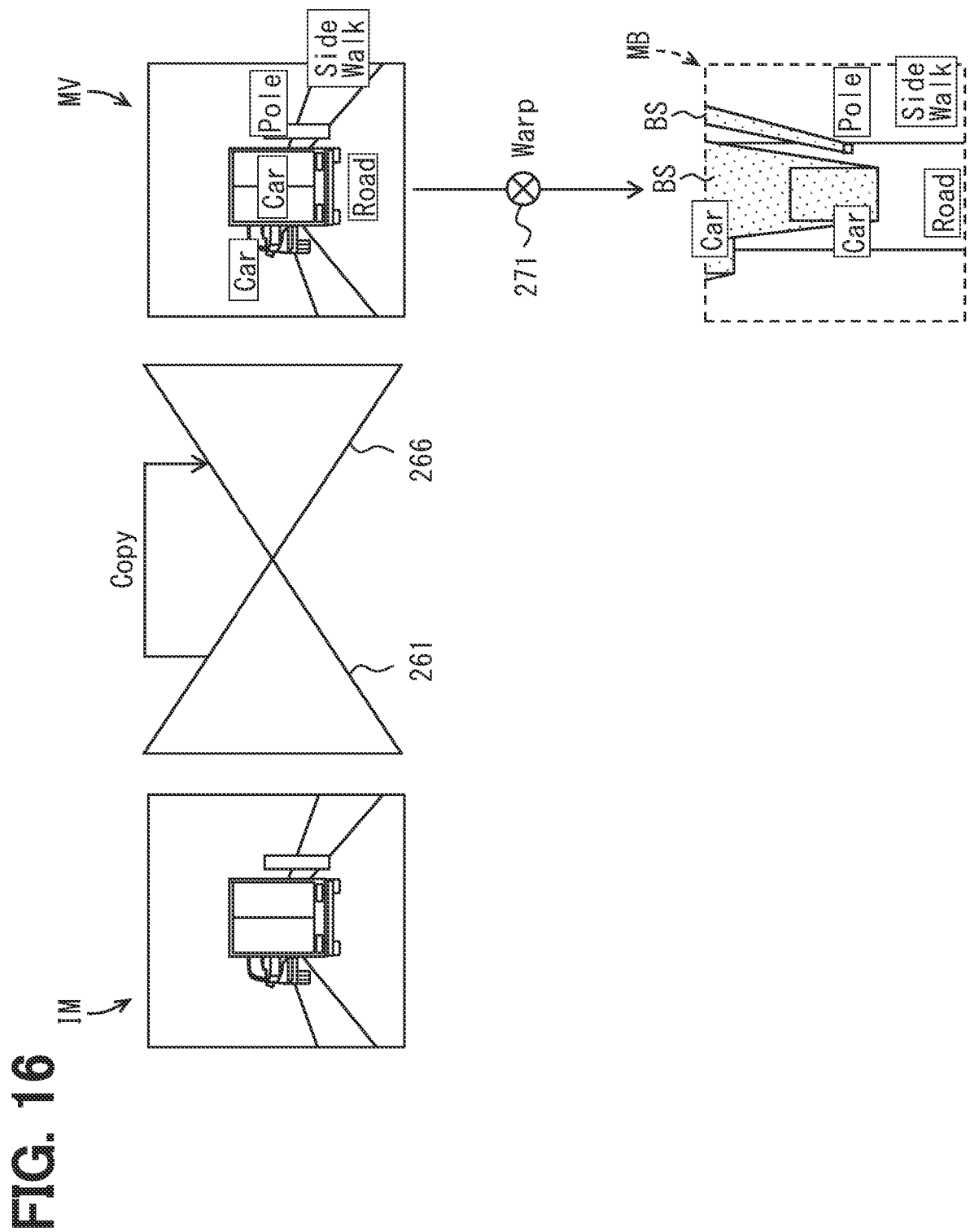
FIG. 16 is a view for describing a viewpoint conversion map generation portion and an object identification model according to the second embodiment.
Figure 17:
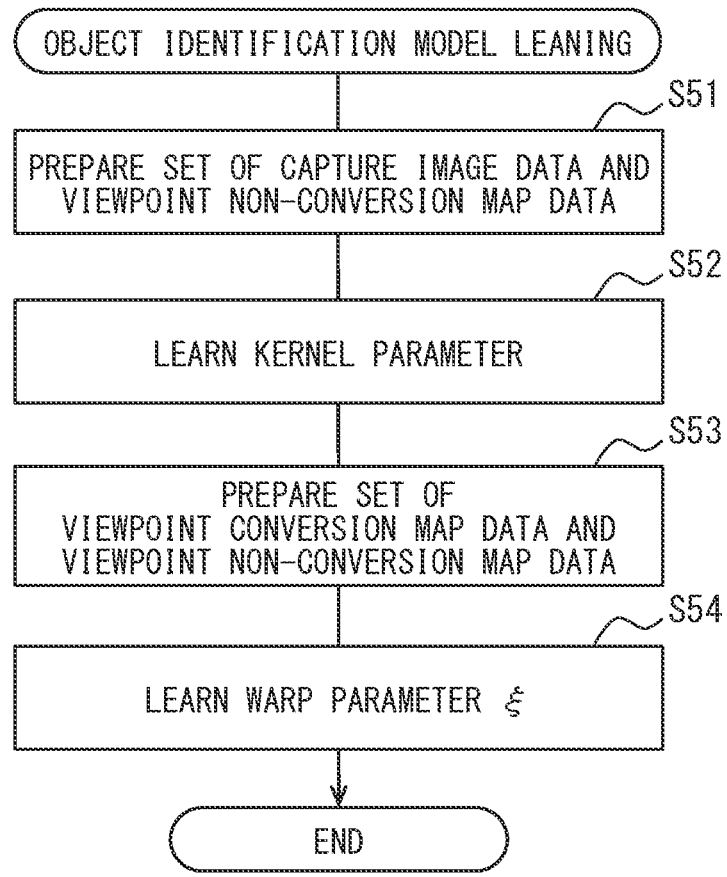
FIG. 17 is a flowchart showing one example of an object identification model learning method according to the second embodiment.

As shown in FIGS. 15 to 17, a second embodiment is a modification of the first embodiment. The second embodiment will be described focusing on differences from the first embodiment.

A viewpoint conversion map generation portion 260 of the second embodiment includes, as shown in FIGS. 15 and 16, an encoder portion 261, a decoder portion 266, and a warp conversion portion 271.

Similarly to the first embodiment, the encoder portion 261 has the multiple (for example, five) feature extraction units 62a to 62e so that the multiple extraction units are connected in series from the input side to the output side. Each of the feature extraction units 62a to 62e has the convolution layers 63a to 63e and the pooling layers 64a to 64e arranged on the output side of the convolution layers 63a to 63e. The convolution layers 63a to 63e and the pooling layers 64a to 64e are connected in series with each other.

Similarly to the first embodiment, the decoder portion 266 includes the multiple (for example, five, which is the same number as the feature extraction units 62a to 62e) identification units 67a to 67e so that the identification units are connected in series from the input side to the output side, and includes the softmax layer 70 on the side closest to the output. Each of the identification units 67a to 67e has the unpooling layers 68a to 68e and the deconvolution layers 69a to 69e arranged on the output side of the unpooling layers 68a to 68e. The unpooling layers 68a to 68e and the deconvolution layers 69a to 69e are connected in series with each other.

The value of the kernel parameter in each layer of the encoder portion 261 and the decoder portion 266 may be unnecessary to be same as the first embodiment since the warp structure is different.

Unlike the first embodiment, the feature map output from each of the pooling layers 64a to 64d is not warped, is merely copied, and input to the unpooling layers 68d to 68a individually corresponding to each of the pooling layers 64a to 64d. This mere copy is concatenated with the input values from the deconvolution layers 69e to 69b adjacent to the input side in the unpooling layers 68d to 68a.

In the feature map finally output from the softmax layer 70 of the decoder portion 266 of the second embodiment, the object is identified by a semantic segmentation. However, the feature map is a viewpoint non-conversion map MV of which viewpoint is not converted, based on the capture coordinate system CV.

The warp conversion portion 271 converts the viewpoint non-conversion map MV output from the decoder portion

266 by using the warp function relating the position of the bird's eye view coordinate system CB to the position of the capture coordinate system CV. This warp function is similar to the mathematical expression of the first embodiment. However, the warp parameter ξ may be different from that of the first embodiment.

By this conversion, the warp conversion portion 271 can generate and output, as the finally output feature map, the viewpoint conversion map MB in which the object in the area of the bird's eye view coordinate system CB is identified.

In the learning method of the object identification model by the viewpoint conversion map generation portion 260 of the second embodiment, the similar method to the first embodiment is employed. The object identification model can be learned by the learning apparatus 80 similar to that of the first embodiment. As shown in a flowchart of FIG. 17, first, the kernel parameter of the convolutional neural network mainly including the encoder portion 261 and the decoder portion 266 is learned. Thereafter, the learning method for learning the warp parameter ξ of the warp function can be employed.

First, the kernel parameter of the convolutional neural network is learned. In detail, multiple sets of the data of the input image IM input by the encoder portion 261 and data of the above described viewpoint non-conversion map MV that is correct answer data in accordance with the data of the input image IM are prepared (see S51 of FIG. 17). This data set serves as the teacher for the convolutional neural network.

The kernel parameter is learned so that, when the input image IM is input to this convolutional neural network, data closer to data that is pair with the input image IM, exists as the correct answer data, and is data of the viewpoint non-conversion map MV is output from the convolutional neural network (see S52 of FIG. 17). Specifically, the input image IM is input to this convolutional neural network. The kernel parameter minimizing the cost is obtained by calculating the difference between the data output from the convolutional neural network and the correct answer data. Thereby, the learning of the convolutional neural network portion of the object identification model is completed.

Next, the warp parameter ξ is learned. In detail, multiple sets of the data of the viewpoint non-conversion map MV before the warp process and the data of the viewpoint conversion map MB that is the correct answer data corresponding to the viewpoint non-conversion map MV are prepared (see S53 of FIG. 17).

The kernel parameter and the warp parameter ξ are learned so that, when the viewpoint non-conversion map MV is input to the warp conversion portion 271, data closer to the data that is pair with the input image IM, exists as the correct data, and is the data of the viewpoint conversion map MB is output from the warp conversion portion 271 (see S54 of FIG. 17). Specifically, the viewpoint non-conversion map MV is input to this warp conversion portion 271. The warp parameter ξ minimizing the cost is obtained by calculating the difference between the data output from the warp conversion portion 271 and the correct answer data. Thereby, the learning of the warp structure portion of the object identification model is completed.

According to the second embodiment described above, the encoder portion 261 and the decoder portion 266 output the viewpoint non-conversion map MV in which the object in the area of the capture coordinate system CV is identified. The warp conversion portion 271 applies the warp function to the viewpoint non-conversion map MV, and outputs it as the viewpoint conversion map MB in which the object in the area of the bird's eye view coordinate system CB is identified. In such a manner, it becomes easy to separately learn or maintain a portion configured by the encoder portion 261 and the decoder portion 266 and a portion configured by the warp conversion portion 271. Therefore, it becomes easy to implement and use the object identification apparatus of the ECU 40.

In the second embodiment, the encoder portion 261 and the decoder portion 266 correspond to the "feature extraction process portion" for convenience. The warp conversion portion 271 corresponds to the "output process portion".

OTHER EMBODIMENTS

Although multiple embodiments have been described above, the present disclosure is not construed as being limited to those embodiments, and can be applied to various embodiments and combinations within a scope that does not depart from the spirit of the present disclosure.

Specifically, in a first modification, when the electronic circuit as the hardware is provided by the ECU 40, the vehicle travel controller 30, the learning apparatus 80, and the like, the electronic circuit can be provided by a digital circuit or an analog circuit including multiple logic circuits.

In a second modification, the memory devices 40c and 82 may be configured by combining multiple storage mediums.

In a third modification, at least a part of the functions of the vehicle travel controller 30 or the HMI instrument portion 20 may be implemented by the ECU 40. In this example, the ECU 40 and the vehicle travel controller 30 may be integrated into one device. On the contrary, a part of the functions of the ECU 40 may be implemented by the vehicle travel controller 30 or the HMI instrument portion 20.

In a fourth modification, the vehicle system 9 may not include the HMI instrument portion 20. In this example, the viewpoint conversion map MB generated by the viewpoint conversion map generation portion 60 may be mainly used for a traveling control of the vehicle 1 by the automatic driving controller 31.

In a fifth modification, the vehicle system 9 may not include the vehicle travel controller 30. In this example, the viewpoint conversion map MB generated by the viewpoint conversion map generation portion 60 may be mainly used for at least one of provision of the visual information by the HMI instrument portion 20, alarm, or vibration.

In a sixth modification, the ECU 40 may not exchange the information with at least one of the cloud 3 or the different vehicle 4.

In a seventh modification regarding the first embodiment, when the feature map is passed from the pooling layer 64e closest to output in the encoder portion 61 to the unpooling layer 68e closest to the input in the decoder portion 66, the warp function may be applied to the feature map.

In an eighth modification regarding the first embodiment, the feature map output by not the pooling layers 64a to 64d but the convolution layers 63a to 63d is output to the warp application portion 65. The warped copy may be input to the decoder portion 66.

In a ninth modification regarding the second embodiment, various structures are used as the convolutional neural network mainly including the encoder portion 261 and the decoder portion 266. As this example, a fully convolutional neural network can be used.

In a tenth modification, the ECU 40 may not be mounted at the vehicle 1 as long as the ECU 40 is communicably connected to the capture portion 10 mounted on the vehicle 1.

In an eleventh modification, as the bird's eye view coordinate system CB of the two dimensional space having the movable direction of the vehicle 1 based on the viewpoint different from the capture viewpoint PVP, not the coordinate system along the virtual surface perpendicular to the vertical center surface, that is, the coordinate system on the basis of the vehicle 1 but a coordinate system along a horizontal plane perpendicular to the gravity direction, that is, a coordinate on the basis of the earth may be used.

In a twelfth modification, the object identification apparatus can be applied to various moving bodies such as a ship or an airplane other than the vehicle. When the object identification apparatus is applied to the airplane, the coordinate system along a plane including the gravity direction may be employed as the coordinate system of the two dimensional space having the movable direction of the moving body based on the viewpoint different from the capture viewpoint PVP. By using the viewpoint conversion map adopting such a coordinate system, the position of the object in the gravity direction can be identified. Therefore, it may be possible to more accurately set a flight altitude of the airplane. The object identification apparatus can be applied to an unmanned transport vehicle or an unmanned moving body such as a drone.

The vehicle system 9 corresponds to one example of a moving body system. The ECU 40 corresponds to one example of the object identification apparatus. The viewpoint conversion map generation portions 60 and 260 correspond to one example of the calculation device. The feature extraction units 62a to 62e correspond to one example of the feature extraction unit. The processor 81 corresponds to one example of the calculation circuit. The bird's eye view coordinate system CB corresponds to one example of the second coordinate system. The capture coordinate system CV corresponds to one example of the first coordinate system.

The control and the method therefor which have been described in the present disclosure may be implemented by a special purpose computer which includes a processor programmed to execute one or more functions executed by computer programs. Also, the device and the method therefor which have been described in the present disclosure may be also realized by a special purpose hardware logic circuit. Alternatively, the device and the method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for instance, as S11. Further, each step can be divided into several sub-steps while several steps can be combined into a single step.

While various embodiments, configurations, and aspects of the object identification apparatus, the moving body system, the object identification method, the object identification model learning method, and the object identification model learning apparatus according to one aspect of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. An object identification apparatus that is communicably connected to a capture portion mounted on a moving body and identifies an object in an outside of the moving body, the object identification apparatus comprising:
    an image acquisition portion acquiring an image of the outside captured by the capture portion from a predetermined capture viewpoint;
    a viewpoint conversion map generation portion that
        forms a convolutional neural network receiving data of the image acquired by the image acquisition portion and
        outputs a viewpoint conversion map obtained by converting the image into a different viewpoint from the capture viewpoint via the convolutional neural network,
    wherein:
    the viewpoint conversion map generation portion includes
        a feature extraction process portion
            applying convolution calculation by the convolutional neural network to the data of the image and
            extracting a feature map of the object in a first coordinate system based on the capture viewpoint and
        an output process portion
            applying a warp function to the feature map extracted by the feature extraction process portion, the warp function relating a position in a second coordinate system based on the different viewpoint to a position in the first coordinate system and
            outputting the viewpoint conversion map in which the object in an area of the second coordinate system is identified;
    the output process portion includes
        a warp application portion applying the warp function to the feature map extracted by the feature extraction process portion and
        an identification process portion
            concatenating the feature map to which the warp function is applied with the convolutional neural network and
            outputting the viewpoint conversion map in which the object in the area of the second coordinate system is identified;
    the feature extraction process portion connects a plurality of feature extraction units in series;
    the plurality of feature extraction units include a convolution layer that performs the convolution calculation and a pooling layer downsampling an output result from the convolution layer by using pooling;
    the identification process portion connects a plurality of identification units in series;
    the plurality of identification units include an upsampling layer that performs upsampling and a deconvolution layer that applies deconvolution calculation to an output result from the upsampling layer;
    the feature map to which the warp function is applied is input to the upsampling layer; and the upsampling layer concatenates an output result from the deconvolution layer connected to an input side with the feature map to which the warp function is applied and perform output.

2. The object identification apparatus according to claim 1, wherein:
the second coordinate system is a coordinate system of a two dimensional space having a movable direction of the moving body.

3. The object identification apparatus according to claim 1, further comprising:
a memory device storing a kernel parameter for a kernel of the convolutional neural network and a warp parameter of the warp function; and
a calculation circuit processing the convolution calculation using the kernel parameter and calculation that uses the warp parameter and applies the warp function.

4. The object identification apparatus according to claim 1, wherein:
the feature extraction process portion outputs the feature map in which the object in an area of the first coordinate system is identified; and
the output process portion
applies the warp function to the feature map in which the object in the area of the first coordinate system is identified and
outputs the feature map as the viewpoint conversion map.

5. The object identification apparatus according to claim 1, wherein:
the capture portion corresponds to a camera; and
the image acquisition portion and the viewpoint conversion map generation portion correspond to a processor.

6. A moving body system for a moving body, the moving body system comprising:
a capture portion that
is mounted on the moving body and
captures an outside of the moving body from a predetermined capture viewpoint and generates an image; and
an object identification apparatus that
is communicably connected to the capture portion and identifies an object in the outside of the moving body, wherein:
the object identification apparatus includes
a viewpoint conversion map generation portion that
forms a convolutional neural network that receives data of the image and
outputs a viewpoint conversion map obtained by converting the image into a viewpoint different from the capture viewpoint;
the viewpoint conversion map generation portion includes
a feature extraction process portion
applying convolution calculation by the convolutional neural network to the data of the image and
extracting a feature map of the object in a first coordinate system based on the capture viewpoint, and
an output process portion
applying a warp function to the feature map extracted by the feature extraction process portion, the warp function relating a position in a second coordinate system based on the different viewpoint to a position in the first coordinate system and
outputting the viewpoint conversion map in which the object in an area of the second coordinate system is identified;
the output process portion includes
a warp application portion applying the warp function to the feature map extracted by the feature extraction process portion and
an identification process portion
concatenating the feature map to which the warp function is applied with the convolutional neural network and
outputting the viewpoint conversion map in which the object in the area of the second coordinate system is identified;
the feature extraction process portion connects a plurality of feature extraction units in series;
the plurality of feature extraction units include a convolution layer that performs the convolution calculation and a pooling layer downsampling an output result from the convolution layer by using pooling;
the identification process portion connects a plurality of identification units in series;
the plurality of identification units include an upsampling layer that performs upsampling and a deconvolution layer that applies deconvolution calculation to an output result from the upsampling layer;
the feature map to which the warp function is applied is input to the upsampling layer; and
the upsampling layer concatenates an output result from the deconvolution layer connected to an input side with the feature map to which the warp function is applied and perform output.

7. The moving body system according to claim 6, further comprising:
an image display portion displaying an image obtained by visualizing the viewpoint conversion map.

8. The moving body system according to claim 6, further comprising:
a movement control portion controlling movement of the moving body by using the viewpoint conversion map.

9. The moving body system according to claim 6, wherein:
the capture portion corresponds to a camera;
the object identification, the viewpoint conversion map generation portion, the feature extraction process portion, and the output process portion correspond to a processor.

10. An object identification method comprising:
inputting data of a capture image of an object captured from a capture viewpoint to a convolutional neural network;
applying the data of the capture image to convolution calculation;
extracting a feature map in a first coordinate system based on the capture viewpoint;
applying a warp function to the feature map, the warp function relating a position in a second coordinate system based on a different viewpoint from the capture viewpoint to a position in the first coordinate system;
obtaining a viewpoint conversion map in which the data of the capture image is converted from the capture viewpoint to the different viewpoint based on the feature map to which the warp function is applied and the object is identified;
concatenating the feature map to which the warp function is applied with the convolutional neural network;

outputting the viewpoint conversion map in which the object in the area of the second coordinate system is identified;

connecting a plurality of feature extraction units in series, wherein the plurality of feature extraction units include a convolution layer that performs the convolution calculation and a pooling layer downsampling an output result from the convolution layer by using pooling;

connecting a plurality of identification units in series, wherein the plurality of identification units include an upsampling layer that performs upsampling and a deconvolution layer that applies deconvolution calculation to an output result from the upsampling layer;

inputting the feature map to which the warp function is applied to the upsampling layer; and causing the upsampling layer to concatenate an output result from the deconvolution layer connected to an input side with the feature map to which the warp function is applied and perform output.

11. An object identification model learning method comprising:

in an object identification model forming a convolutional neural network and a warp structure warping a feature map extracted in the convolutional neural network to a different coordinate system, preparing, in the warp structure, a warp parameter for relating a position in the different coordinate system to a position in a coordinate system before warp;

learning the warp parameter to input a capture image in which an object is captured to the object identification model and output a viewpoint conversion map in which the object is identified in the different coordinate system, preparing depth data indication a depth of the object on the capture image; and before the learning, determining a displacement amount of a part of the warp parameter by referring the depth data, wherein:
the displacement amount corresponds to a position outside a blind angle area in accordance with a blind angle due to the object on the capture image; and
in the learning, in a state where the displacement amount of the part is confirmed, a kernal parameter for the convolutional neural network and a different part of the warp parameter in a non-determined state are simultaneously learned.

12. The object identification mode learning method according to claim 11, further comprising:

before the learning, preparing a set of data of the capture image in which the object is captured and data that is correct answer data corresponding to the data of the capture image and is data of the viewpoint conversion map in which the object is identified, wherein:
in the learning, when the data of the capture image is input to the object identification model, the kernel parameter for the convolutional neural network and the warp parameter are simultaneously learned to output data closer to the correct data is output.

13. The object identification model learning method according to claim 11, wherein:

in the learning, a correspondence between a position on the viewpoint conversion map corresponding to the blind angle area and a position on the capture image is searched.

14. An object identification model learning apparatus for learning an object identification model, the object identification model learning apparatus comprising:

a calculation circuit executing a calculation process of the object identification model that forms a convolutional neural network and a warp structure that warps a feature map extracted in the convolutional neural network to a different coordinate system;

a teacher data setting portion setting data of a capture image of an object captured from a capture viewpoint and an output map, as correct answer data, in which the object is identified in a coordinate system based on a different viewpoint from the capture viewpoint;

a learning portion
learning a kernel parameter for a kernel of the convolutional neural network and a warp parameter for the warp structure to output data closer to the correct data when the capture image is input to the object identification model, and
before learning of the kernal parameter, determining a displacement amount of a part of the warp parameter by referring depth data indicating a depth of the object on the capture image; and a memory device storing kernel parameter and the warp parameter that are learned by the learning portion, wherein
the displacement amount corresponds to a position outside a blind angle area in accordance with a blind angle due to the object on the capture image; and
in the learning, in a state where the displacement amount of the part is confirmed, the kernal parameter for the convolutional neural network and a different part of the warp parameter in a non-determined state are simultaneously learned.

15. The object identification model learning apparatus according to claim 14, wherein:

the teacher data setting portion and the learning portion correspond to a processor.

16. An object identification apparatus that is communicably connected to a camera mounted on a moving body and identifies an object in an outside of the moving body, the object identification apparatus comprising:

an image acquisition portion that is connected to the camera and acquires an image of the outside captured by the camera;

a learning value memory storing a learning value;

a calculation device
reading a kernel parameter from the learning value memory,
forming a convolutional neural network including an encoder that includes a plurality of feature amount extraction units and a decoder portion that includes a plurality of identification units,
causing the encoder portion to extract a feature map of a feature amount of the object from data of the image acquired by the image acquisition portion,
reading a warp parameter from the learning value memory,
generating a plurality of warp functions corresponding to the plurality of identification units,
applying the plurality of warp functions to the feature map to cause the plurality of identification units to read the plurality of warp functions respectively corresponding identification units, and
generating a viewpoint conversion map of which viewpoint is converted into a different viewpoint from a viewpoint captured by the camera; and an identification process portion
concatenating the feature map to which the warp function is applied with the convolutional neural network and
outputting the viewpoint conversion map in which the object is identified, wherein
the encoder connects a plurality of feature amount extraction units in series;
the plurality of feature amount extraction units include a convolution layer that performs convolution calculation and a pooling layer downsampling an output result from the convolution layer by using pooling;
the identification process portion connects a plurality of identification units in series;
the plurality of identification units include an upsampling layer that performs upsampling and a deconvolution layer that applies deconvolution calculation to an output result from the upsampling layer;
the feature map to which the warp function is applied is input to the upsampling layer; and
the upsampling layer concatenates an output result from the deconvolution layer connected to an input side with the feature map to which the warp function is applied and perform output.

17. The object identification apparatus according to claim 16, wherein:
the calculation device, the image acquisition portion, the encoder portion, the plurality of feature amount extraction units, the decoder portion, the plurality of identification units, and the identification process portion correspond to a processor.

* * * * *